US012780687B2

(12) United States Patent
Ray et al.

(10) Patent No.: US 12,780,687 B2
(45) Date of Patent: Nov. 3, 2026

(54) SPENT COFFEE GROUND BIOCHAR, RELATED METHODS OF MAKING, ENVIRONMENTAL REMEDIATION SYSTEMS, AND METHODS OF REMOVING CONTAMINANTS FROM SOLUTION

(71) Applicant: University of Washington, Seattle, WA (US)

(72) Inventors: Jessica Ray, Seattle, WA (US); Jessica Steigerwald, Seattle, WA (US)

(73) Assignee: University of Washington, Seattle, WA (US)

( * ) Notice: Subject to any disclaimer, the term of this patent is extended or adjusted under 35 U.S.C. 154(b) by 680 days.

(21) Appl. No.: 18/044,385

(22) PCT Filed: Oct. 27, 2021

(86) PCT No.: PCT/US2021/056771
§ 371 (c)(1),
(2) Date: Mar. 8, 2023

(87) PCT Pub. No.: WO2022/093908
PCT Pub. Date: May 5, 2022

(65) Prior Publication Data

US 2024/0228327 A1 Jul. 11, 2024

Related U.S. Application Data

(60) Provisional application No. 63/107,267, filed on Oct. 29, 2020.

(51) Int. Cl.
*C02F 1/28* (2023.01)
*C02F 101/36* (2006.01)
*C02F 103/00* (2006.01)

(52) U.S. Cl.
CPC .......... *C02F 1/283* (2013.01); *C02F 2101/36* (2013.01); *C02F 2103/001* (2013.01)

(58) Field of Classification Search
CPC ................ B01J 20/3078; B01J 20/3085; B01J 2220/4887; B01J 2220/4885
See application file for complete search history.

(56) References Cited

U.S. PATENT DOCUMENTS

2014/0250775 A1* 9/2014 Tennenhouse .......... C10L 5/447 44/551

FOREIGN PATENT DOCUMENTS

| | | | | | |
|---|---|---|---|---|---|
| KR | 19990070311 | A | * | 9/1999 | ............. C01B 32/30 |
| KR | 101831607 | B1 | * | 2/2018 | .............. C10L 5/363 |
| KR | 20200038656 | A | * | 4/2020 | .......... B01J 20/3007 |
| PT | 103520 | B | * | 7/2008 | |

OTHER PUBLICATIONS

Deng, S., Nie, Y., Du, Z., Huang, Q., Meng, P., Wang, B., Huang, J. and Yu, G. 2015. Enhanced adsorption of perfluorooctane sulfonate and perfluorooctanoate by bamboo-derived granular activated carbon. J. Hazard. Mater. 282, 150-157.
Inyang, M. and Dickenson, E. 2015. The potential role of biochar in the removal of organic and microbial contaminants from potable and reuse water: a review. Chemosphere 134, 232-240.
Kim, M.-S., Min, H.-G., Koo, N., Park, J., Lee, S.-H., Bak, G.-I. and Kim, J.-G. 2014. The effectiveness of spent coffee grounds and its biochar on the amelioration of heavy metals-contaminated water and soil using chemical and biological assessments. J. Environ. Manage. 146, 124-130.
Laksaci, H., Khelifi, A., Trari, M. and Addoun, A. 2017. Synthesis and characterization of microporous activated carbon from coffee grounds using potassium hydroxides. J. Clean. Prod. 147, 254-262.
Linares-Solano, A., Lillo-Ródenas, M. A., Marco-Lozar, M. P., Kunowsky, M., Romero-Anaya, A. J. NaOH and KOH for preparing activated carbons used in energy and environmental applications. International Journal of Energy, Environment and Economics 20(4), 59-91.
Nguyen, V.-T., Nguyen, T.-B., Chen, C.-W., Hung, C.-M., Vo, T.-D.-H., Chang, J.-H. and Dong, C.-D. 2019. Influence of pyrolysis temperature on polycyclic aromatic hydrocarbons production and tetracycline adsorption behavior of biochar derived from spent coffee ground. Bioresour. Technol. 284, 197-203.

* cited by examiner

*Primary Examiner* — Ryan B Huang
(74) *Attorney, Agent, or Firm* — Christensen O'Connor Johnson Kndness, PLLC

(57) ABSTRACT

A method of producing biochar from spent coffee grounds, biochar, such as biochar produced according to the methods of the present disclosure, an environmental remediation system including biochar according to embodiments of the present disclosure, and methods of removing contaminants from an aqueous solution using biochar according to embodiments of the present disclosure are described. In an embodiment, the method of producing biochar from spent coffee grounds comprises heating dried spent coffee grounds in an oven in a first pyrolysis temperature range to provide an intermediate biochar; and heating the intermediate biochar and a caustic in the oven in a second pyrolysis temperature range to provide the biochar.

13 Claims, 29 Drawing Sheets

| CHAR MATERIAL | NON-LINEAR PSEUDO FIRST ORDER | | | LANGMUIR | | FREUNDLICH | | |
|---|---|---|---|---|---|---|---|---|
| | $k_1$ [$h^{-1}$] | $\sigma^2$ | $q_{max}$ | $q_{max}$ | $R^2$ | $K_F$ | 1/n | $R^2$ |
| SCHKOH | 0.069 | 0.003 | 43.4 | 43.4 | 0.996 | 1.581 | 0.414 | 0.988 |
| F300 | 0.090 | 0.016 | 55.7 | 55.7 | 0.993 | 9.434 | 0.228 | 0.992 |
| MCG | 0.414 | 0.040 | 79.5 | 79.5 | 0.997 | 2.272 | 0.439 | 0.998 |

FIG. 2G

| | NON-LINEAR PSEUDO FIRST ORDER | | | LINEAR PSEUDO FIRST ORDER | | | LINEAR PSEUDO SECOND ORDER | | | |
|---|---|---|---|---|---|---|---|---|---|---|
| | $q_{e,exp}$ (mg/g) | $k_1$ ($h^{-1}$) | $\sigma^2$ | $q_{e,calc}$ (mg/g) | $k_1$ (h) | $\sigma^2$ | $q_{e,calc}$ (mg/g) | $v_0$ (mg/g*h) | LOG ($K_{d,eq}$) (L/kg) | $\sigma^2$ |
| SCHKOH | 2.538 | 0.069 | 0.003 | 2.480 | 0.065 | 0.025 | 2.818 | 0.230 | 5.359 | 0.232 |
| F300 | 2.337 | 0.090 | 0.016 | 2.343 | 0.148 | 0.023 | 2.495 | 0.368 | 6.212 | 0.183 |
| MCG | 2.309 | 0.414 | 0.040 | 2.169 | 0.483 | 1.137 | 2.337 | 1.680 | 6.762 | 0.083 |

FIG. 9D

SPENT COFFEE GROUND BIOCHAR, RELATED METHODS OF MAKING, ENVIRONMENTAL REMEDIATION SYSTEMS, AND METHODS OF REMOVING CONTAMINANTS FROM SOLUTION

CROSS-REFERENCES TO RELATED APPLICATIONS

The present application is a U.S. National Stage of International Application No. PCT/US2021/056771, filed on Oct. 27, 2021, which claims the benefit of U.S. Provisional Patent Application No. 63/107,267, filed Oct. 29, 2020, the disclosures of which are incorporated herein by reference in entirety.

BACKGROUND

Rainfall on urban landscapes in densely populated cities can have severe impacts on the hydrologic cycle. Higher volumes of "urban stormwater" runoff can overwhelm stormwater management systems resulting in overflow events where runoff and/or raw sewage are directly discharged to receiving water bodies. Furthermore, urban stormwater contacts engineered and impervious surfaces (e.g., pavement, buildings, vehicles) during conveyance, transporting elevated concentrations of pollutants which threaten human and environmental health. Decentralized approaches known as best management practices (BMPs) are a potential solution to facilitate local groundwater recharge via stormwater infiltration, and to better manage large volumes of urban runoff to prevent overflow events; however, these systems are unable to adequately remove all contaminants present in urban runoff.

Activated carbon—a common, industrial adsorbent media employed in air and water purification processes—is typically prepared from wood, charcoal, or coconut shell raw materials followed by chemical activation to achieve high reactivity for treatment. Unfortunately, conventional activated carbon is expensive ($20-$22/kg), can require large quantities of chemical additives (e.g., 25 wt % phosphoric acid, 5 wt % potassium hydroxide, 25 wt % zinc chloride) to activate the charcoal, and its production contributes to greenhouse gas emissions (e.g., 18 kg $CO_2$/kg produced).

Accordingly, there is presently a need for a process of generating activated charcoal that avoids or reduces the effects of these noted challenges and disadvantages.

SUMMARY

The present disclosure provides methods of producing activated carbon, such as in the form of biochar, and activated carbon that address these and related challenges through the use of spent coffee grounds (SCG), as well as biochar produced according to the methods of the present disclosure, environmental remediation system including biochar according to embodiments of the present disclosure, and methods of removing contaminants from an aqueous solution using biochar according to embodiments of the present disclosure.

Characterization of the SCG biochar of the present disclosure indicates the capacity for high trace contaminant removal in water. Furthermore, the SCG biochar of the present disclosure is robust and resistant to physical shearing, and has high hydraulic conductivity, which are important media properties for water filtration applications. In this regard, the SCG biochar of the present disclosure is suitable for use as a soil amendment in existing or planned urban stormwater treatment infrastructure (e.g., bioretention ponds, rain gardens), and/or point-of-use filters for column filtration of urban stormwater or contaminated drinking water.

Accordingly, in an aspect, the present disclosure provides a method of producing biochar. In an embodiment, the method comprises heating dried spent coffee grounds in an oven in a first pyrolysis temperature range to provide an intermediate biochar; and heating the intermediate biochar and a caustic in the oven in a second pyrolysis temperature range to provide the biochar.

In another aspect, the present disclosure provides biochar produced according to a method of the present disclosure.

In another aspect, the present disclosure provides an environmental remediation system comprising: a porous matrix; and spent coffee grounds biochar according to any embodiments of the present disclosure distributed within the porous matrix. In accordance with any embodiment of the present disclosure, a weight percent of the spent coffee grounds biochar is in a range of about 0.5 wt. % to about 5.0 wt. %. In accordance with any embodiment of the present disclosure, the porous matrix is selected from the group consisting of sand, gravel, soil, and combinations thereof. In accordance with any embodiment of the present disclosure, the porous matrix is sand.

In another aspect, the present disclosure provides a method of removing contaminants from an aqueous solution. In an embodiment, the method comprises passing the aqueous solution through dried spent coffee ground biochar according to any embodiments of the present disclosure, thereby removing the contaminants from the aqueous solution. In an embodiment, the dried spent coffee ground biochar has a surface area in a range of about 700 $m^2/g$ to about 900 $m^2/g$. In an embodiment, the dried spent coffee ground biochar is distributed within a porous matrix. In an embodiment, the aqueous solution is selected from the group consisting of storm water runoff, sewage, drinking water, and combinations thereof.

In accordance with any embodiment of the present disclosure, the first pyrolysis temperature range is in a range of about 200° C. to about 500° C., and wherein the second pyrolysis temperature range is in a range of about 200° C. and about 1,000° C.

In accordance with any embodiment of the present disclosure, heating the dried spent coffee grounds comprises: heating the oven in which the dried spent coffee grounds are disposed to a first evaporation temperature for a time sufficient to evaporate water and other liquid from within pore spaces of the spent coffee grounds; and heating the oven in which the dried spent coffee grounds are disposed to a first pyrolysis temperature for time sufficient to pyrolyze the dried spent coffee grounds. In accordance with any embodiment of the present disclosure, first evaporation temperature is about 200° C. and wherein the first pyrolysis temperature is about 400° C. In accordance with any embodiment of the present disclosure, heating the oven to the first evaporation temperature includes heating the oven at a heating rate of about 10° C./min, wherein the oven is maintained at the first evaporation temperature for about an hour, wherein heating the oven to the first pyrolysis temperature includes heating the oven at a heating rate of about 10° C./min, and wherein the oven is maintained at the first pyrolysis temperature for about four hours. In accordance with any embodiment of the present disclosure, heating the intermediate biochar and the caustic comprises: heating the intermediate biochar and the caustic at a second evaporation temperature for a time sufficient to evaporate water and other liquid from within pore spaces of the intermediate biochar; and heating the intermediate biochar and the caustic at a second pyrolysis temperature for a time sufficient to pyrolyze the intermediate biochar. In accordance with any embodiment of the present disclosure, the second evaporation temperature is about 200° C., and wherein the second pyrolysis temperature is about 800° C. In accordance with any embodiment of the present disclosure, heating the oven to the second evaporation temperature includes heating the oven at a heating rate of about 10° C./min, wherein the oven is maintained at the second evaporation temperature for about an hour, wherein heating the oven to the second pyrolysis temperature includes heating the oven at a heating rate of about 10° C./min, and wherein the oven is maintained at the second pyrolysis temperature for about 30 minutes.

In accordance with any embodiment of the present disclosure, the method includes flowing an inert gas through the oven while heating the dried spent coffee grounds and while heating the intermediate biochar. In accordance with any embodiment of the present disclosure, the inert gas is nitrogen gas.

In accordance with any embodiment of the present disclosure, the caustic is potassium hydroxide.

In accordance with any embodiment of the present disclosure, a mass:mass ratio of the caustic to the intermediate biochar is about 1:1.

In accordance with any embodiment of the present disclosure, the method includes mixing the intermediate biochar and caustic.

In accordance with any embodiment of the present disclosure, the method includes drying the spent coffee grounds to provide the dried spent coffee grounds.

In accordance with any embodiment of the present disclosure, the method includes rinsing the biochar. In accordance with any embodiment of the present disclosure, rinsing the biochar comprises rinsing the biochar with a dilute acidic solution.

In accordance with any embodiment of the present disclosure, the biochar has a surface area in a range of about 700 $m^2/g$ to about 900 $m^2/g$. In accordance with any embodiment of the present disclosure, the biochar has a surface area of about 858 $m^2/g$. In accordance with any embodiment of the present disclosure, the biochar has a surface area of about 852 $m^2/g$.

In an embodiment, the biochar has a fixed carbon percentage in a range of about 70% to about 90%. In an embodiment, the biochar has a fixed carbon percentage in a range of about 80% to about 90%. In an embodiment, the biochar has a fixed carbon percentage in a range of about 85% to about 90%. In accordance with any embodiment of the present disclosure, the biochar has a fixed carbon percentage of about 85%. In accordance with any embodiment of the present disclosure, the biochar comprises about 81% elemental carbon. In accordance with any embodiment of the present disclosure, the biochar has a zeta potential in a range of about −35 mV to about −55 mV, such as within a circumneutral pH.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2G provides non-linear pseudo first order rate constant ($k_1$) and square error ($\sigma^2$), Langmuir maximum adsorption capacity ($q_{max}$) and adsorption rate constant ($K_L$), and Freundlich adsorption rate constant ($K_F$) and coefficient of non-linearity (1/n), in accordance with an embodiment of the present disclosure;

DETAILED DESCRIPTION

Figure 1:
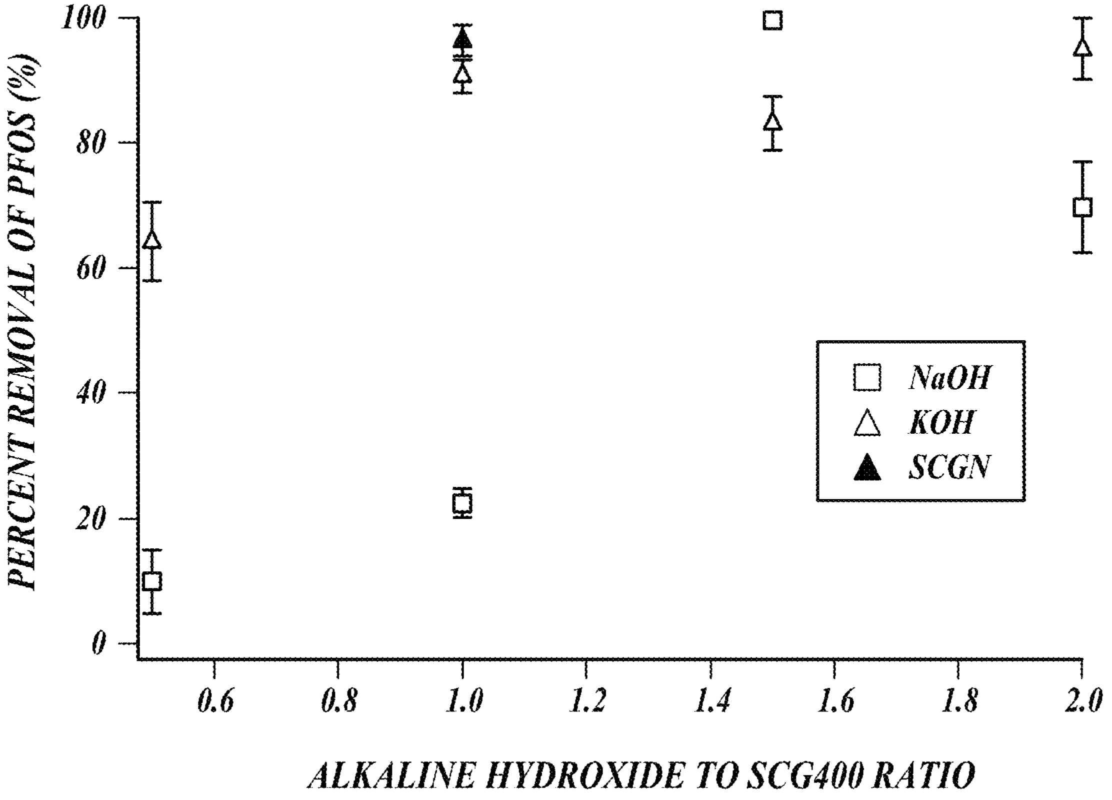
FIG. 1 illustrates percent removal of 44±13 μg/L perfluorooctanesulfonic acid (PFOS) by 100 mg/L activated spent coffee grounds SCG biochar, according to an embodiment of the present disclosure, as a function of the ratio of alkaline hydroxide activating agent to an SCG precursor heated at 400° C. (SCG400) used in production, where "SCGN" was produced with the second batch of spent coffee grounds.

Carbonaceous media, such as activated carbon, possess high porosity, large surface area, and surface functional groups that facilitate removal of many contaminant classes via pore diffusion, surface complexation, and other weak interactions. As such, activated carbon is widely used adsorbent in water treatment. Activated carbon is generated by pyrolysis of carbon-rich source materials (e.g., coal, tar, coconut husks, tar pitch) followed by chemical activation to achieve high reactivity for air and water purification. Unfortunately, activated carbon is expensive ($1000/ton), high levels of chemical additives are needed to achieve activation, and its production contributes to greenhouse gas emissions (18 kg $CO_2$ eq/kg produced).

Conversely, biochar is a low-cost, pyrolyzed carbonaceous media that can offer similar benefits as activated carbon and can be produced under more environmentally friendly conditions. Biochar biomass food waste sources can include wheat straw, rice hulls, wood, and switchgrass. The intended functions of the porous, carbonaceous biochar are to improve soil properties and fertility, and retain water and nutrients in soils as a soil amendment. In addition to the intended agricultural benefits, lab-scale investigations suggest a capacity of biochar to remove nutrients, bacteria and pathogens, heavy metals, and organic compounds in water.

As described further herein, the present disclosure provides methods of producing biochar using spent coffee grounds—i.e. ground coffee beans that have been used to prepare coffee through extraction of organic compounds into an aqueous solution. Using spent coffee grounds as the biomass feedstock is advantageous because coffee is a carbon-rich source that is widely available across the country that tends to be separated from other compost. In this regard, the present disclosure provides a circular economy model by converting and upcycling a widely available and local source of coffee grounds into a material capable of removing contaminants from water.

Biochars can exhibit sustained contaminant removal over many years owing to their high reactivity and porosity. For example, data suggests that commercial biochar is capable of removing trace metals and trace organic compounds in urban stormwater for periods of 5-50 years depending on the contaminant load. This is highly beneficial for passive contaminant removal if our coffee biochar were amended in soils and if coffee biochar were packaged in home filter systems. Long lifetime and reactivity will reduce operational and maintenance costs associated with replacing media.

An additional advantage and innovation of the coffee biochar technology of the present disclosure is the use of coffee grounds as the source material. Coffee is a common biomass feedstock unrestricted by geographic region, unlike other biomass feedstocks that are primarily only located in agricultural regions. The U.S. imports over 1 million metric tons of coffee annually, which is dispersed across the country. Therefore, the methods of the present disclosure are not be limited by access to source material.

There are many possible applications of the coffee biochar adsorbent media. These include urban stormwater treatment and point-of-use water filters.

Stormwater is a major component of the urban water cycle, contributing to street flooding and high runoff volumes in urban areas with large degrees of impervious surface coverage (e.g., concrete, roadways, etc.). In urban areas where space is limited, engineers and city planners have begun installing stormwater infrastructure such as rain gardens, bioswales, and bioretention ponds to promote local groundwater recharge and to decrease street flooding. These infrastructures are typically vegetated systems that contain conventional filtration media (e.g., sand, gravel, soil and compost) to maintain high hydraulic conductivity and to filter large particles in urban stormwater. Unfortunately, urban stormwater typically contains elevated contaminant concentrations that are not well-removed by conventional filtration media. Employing engineered media as soil amendments or during centralized stormwater management can enhance contaminant removal in urban stormwater prior to infiltration in stormwater infrastructures and prior to discharge to receiving bodies of water.

As stated before, biochar is well-suited for soil amendment application. Coffee biochar is suitable to passively remove contaminants as urban stormwater infiltrates. Coffee biochar filters can also be employed in on-site urban stormwater treatment at facilities designed to manage runoff volume and contamination levels.

Coffee biochar adsorbent media is also appropriate for column filter design to treat other waste streams such as wastewater, and purification of drinking water sources. Coffee biochar filters can be packaged to mimic designs of Brita® home, point-of-use filters.

Accordingly, in an aspect the present disclosure provides a method of producing biochar from spent coffee grounds. As used herein, "spent coffee grounds" refers to ground coffee beans, which have been used to prepare coffee, such as through extraction of organic compounds from the ground coffee beans into an aqueous solution. The method of coffee preparation can be any method of coffee preparation and the methods of the present disclosure are not limited by the method of coffee preparation. Spent coffee grounds are in contrast to, for example, fresh coffee grounds that have not been used to prepare coffee, such as through extraction of organic compounds therefrom.

In an embodiment, the methods of the present disclosure use spent coffee grounds, such as dried spent coffee grounds, as a starting material. Spent coffee grounds may be dried to remove water, such as water used in the preparation of coffee, in order to prevent or slow degradation or spoilage of the spent coffee grounds. Accordingly, in an embodiment, the method can include drying spent coffee grounds, such as to remove some or all of any water absorbed within or adsorbed on the spent coffee grounds. Such drying can include maintaining the spent coffee grounds at an elevated temperature, such as in a drying temperature range of about 70° C. to about 100° C., for a period of time sufficient to remove some or all of any water absorbed within or adsorbed on the spent coffee grounds. In an embodiment, the drying temperature is about 90° C. and the drying time is in a range of about 24 hours to about 48 hours.

In an embodiment, the method includes heating dried spent coffee grounds in an oven in a first pyrolysis temperature range to provide an intermediate biochar. Such heating of the dried spent coffee grounds in a first pyrolysis temperature range is suitable to carbonize or pyrolyze the dried spent coffee grounds. In an embodiment, the first pyrolysis temperature range is in a range of about 200° C. to about 800° C. In an embodiment, the first pyrolysis temperature range is in a range of about 200° C. to about 500° C. In an embodiment, the first pyrolysis temperature range is about 400° C.

In an embodiment, heating the dried spent coffee grounds comprises heating spent coffee grounds at a first evaporation temperature for a time sufficient to evaporate water and other liquid from within pore spaces of the spent coffee grounds to provide the dried spent coffee grounds; and heating the dried spent coffee grounds at the first pyrolysis temperature for time sufficient to pyrolyze the dried spent coffee grounds. In an embodiment, the first evaporation temperature is in a range of about 100° C. to about 300° C., such as about 200° C., and the first pyrolysis temperature is in a range of about 300° C. to about 800° C., such as about 400° C., such as to evaporate or otherwise remove water and/or other liquid from within pore spaces of the spent coffee grounds to provide the dried spent coffee grounds.

In an embodiment, heating the oven to the first evaporation temperature and the first pyrolysis temperature includes ramping or increasing a temperature of an oven to achieve the first evaporation temperature and the first pyrolysis temperature, where ramping or increasing the temperature occurs at a temperature increase or heating rate. In an embodiment, heating the oven to the first evaporation temperature includes heating the oven at a heating rate of about 10° C./min, wherein the oven is maintained at the first evaporation temperature for about an hour, wherein heating the oven to the first pyrolysis temperature includes heating the oven at a heating rate of about 10° C./min, and wherein the oven is maintained at the first pyrolysis temperature for about four hours. While such rates are exemplified in the Examples of the present disclosure, it will be understood that other rates are possible and within the scope of the present disclosure.

In an embodiment, the methods do not include further heating the biochar. However, in an embodiment, the methods of the present disclosure include heating the intermediate biochar and a caustic in the oven in a second pyrolysis temperature range to provide the biochar. As discussed further herein with respect to the Examples of the present disclosure, heating the intermediate biochar with a caustic can dramatically increase the surface area of the prepared biochar. Without wishing to be bound by theory, it is believed that such an increase in surface area of the biochar also contributes to an increase in the ability of the biochar to adsorb organic and other contaminants from solution.

In an embodiment, the caustic is a basic compound. In an embodiment, the caustic includes a caustic selected from the group consisting of potassium hydroxide, sodium hydroxide, calcium oxide, and combinations thereof. In an embodiment, the caustic is potassium hydroxide. In an embodiment, the caustic is in the form of one or more pellets of the caustic.

In an embodiment, a mass:mass ratio of the caustic to the intermediate biochar is in a range of about 0.5:1 to about 2:1. In an embodiment, a mass:mass ratio of the caustic to the intermediate biochar is about 1:1.

In an embodiment, the intermediate biochar is mixed with the caustic, such as before or during heating in an oven. Accordingly, in an embodiment, the method includes mixing the intermediate biochar and caustic, such as in the oven.

In an embodiment, heating the intermediate biochar and the caustic comprises heating the intermediate biochar and the caustic at a second evaporation temperature for a time sufficient to evaporate water and other liquid from within pore spaces of the intermediate biochar; and heating the intermediate biochar and the caustic at a second pyrolysis temperature for a time sufficient to pyrolyze the intermediate biochar.

In an embodiment, the second evaporation temperature is in a second evaporation temperature range of about 100° C. to about 300° C., such as at about 200° C. In an embodiment, the second pyrolysis temperature is in a second pyrolysis temperature range of about 700° C. to about 1000° C., such as at about 800° C.

As heating the oven to the first evaporation temperature and the first pyrolysis temperature includes ramping or increasing a temperature of an oven, in an embodiment, heating the intermediate biochar and the caustic at the second evaporation temperature and heating the intermediate biochar and the caustic at the second pyrolysis temperature can include ramping or increasing the oven temperature at particular ramp rates. In an embodiment, heating the oven to the second evaporation temperature includes heating the oven at a heating rate of about 10° C./min, wherein the oven is maintained at the second evaporation temperature for about an hour, wherein heating the oven to the second pyrolysis temperature includes heating the oven at a heating rate of about 10° C./min, and wherein the oven is maintained at the second pyrolysis temperature for about 30 minutes.

In an embodiment, the methods of the present disclosure include flowing an inert gas through the oven while heating the dried spent coffee grounds and while heating the intermediate biochar. Such flowing of the inert gas can include flowing the inert gas at a rate and/or at a concentration within the oven sufficient to maintain an oxygen-poor and/or oxygen-free environment, such as an oxygen-poor environment suitable to reduce or avoid oxidation of the spent coffee grounds and/or intermediate biochar through contact with oxygen. In an embodiment, the inert gas is selected from the group consisting of nitrogen, carbon dioxide, helium, argon, and combinations thereof. In an embodiment, the inert gas comprises or consists of nitrogen.

In an embodiment, the method includes rinsing the biochar, such as after mixing with and/or heating with the caustic. Such rinsing can remove or neutralize the caustic within the biochar. Accordingly, in an embodiment, rinsing the biochar comprises rinsing the biochar with a dilute acidic solution, such as to neutralize the caustic. In an embodiment, rinsing the biochar comprises rinsing the biochar with water.

In another aspect, the present disclosure provides a biochar comprising pyrolyzed spent coffee grounds. In an embodiment, the biochar is produced according to a method of the present disclosure.

As discussed further herein with respect the Examples of the present disclosure, in certain embodiments, the biochar of the present disclosure has high surface area, such as a surface area suitable to adsorb or otherwise remove contaminants from a solution. In an embodiment, the biochar has a surface area in a range of, about 200 $m^2/g$ to about 1500 $m^2/g$, about 400 $m^2/g$ to about 1000 $m^2/g$, about 500 $m^2/g$ to about 950 $m^2/g$, or about 700 $m^2/g$ to about 900 $m^2/g$. In an embodiment, the biochar has a surface area in a range of, about 800 $m^2/g$ to about 1100 $m^2/g$. In an embodiment, the biochar has a surface area of about 850 $m^2/g$.

In addition to high surface areas, in certain embodiments, the biochar also has relatively small pore sizes. Without wishing to be bound by theory, it is believed that such small pore size is further indication of high adsorption capacity. In an embodiment, the biochar of the present disclosure has an average pore size (such as a Barrett, Joyner, and Halenda (BJH) average pore radius) in a range of about 1 nm to about 5 nm, such as in a range of about 1 nm to about 3 nm.

In an embodiment, the biochar has a fixed carbon percentage in a range of about 70% to about 90%. In an embodiment, the biochar has a fixed carbon percentage in a range of about 80% to about 90%. In an embodiment, the biochar has a fixed carbon percentage in a range of about 85% to about 90%. As discussed further herein with respect to the Examples of the present disclosure, carbonization and/or pyrolysis of the spent coffee grounds, such as part of the methods of the present disclosure, generally leads to an increase in fixed carbon content via elimination of volatile carbon content from the spent coffee grounds. Accordingly, the relatively high fixed carbon content of the biochar of the present disclosure, in certain embodiments, is indicative of removal of volatile carbon from the spent coffee grounds. Correspondingly, in an embodiment, the biochar of the present disclosure has a volatile carbon content of less than 10%, such as in a range of about 10% to about 1%.

In an embodiment, the biochar has a negative zeta potential. In an embodiment, the biochar has a zeta potential in a range of about −20 mV to about −55 mV, such as in a range of about −35 mV to about −55 mV. As discussed further herein with respect to the Examples of the present disclosure, without wishing to be bound by theory, it is believed that such negative zeta potential indicates more acid-based surface functional groups upon activation and that this negative surface charge suggests biochar of the present disclosure will have high adsorption affinities for positively charged ions.

Such adsorptive capabilities are demonstrated further herein in the Examples of the present disclosure in removing organic contaminants from simulated stormwater runoff.

In another aspect, the present disclosure provides an environmental remediation system. In an embodiment, the environmental remediation system comprises a porous matrix; and spent coffee grounds biochar distributed within the porous matrix. Such environmental remediation system can be used in the adsorption of contaminants, such as in wastewater or storm runoff, and in use as a soil amendment.

The biochar can be biochar according to any embodiment of the present disclosure. In an embodiment, the biochar has a surface area in a range of about 700 $m^2/g$ to about 900 $m^2/g$. In an embodiment, the biochar has a fixed carbon percentage in a range of about 70% to about 85%. In an embodiment, the biochar has a zeta potential in a range of about −35 mV to about −55 mV.

As above, the spent coffee ground biochar is dispersed or distributed within a porous matrix. Such a porous matrix can be any porous matrix suitable to carry the biochar or into which the biochar may be distributed. In an embodiment, the porous matrix is selected from the group consisting of sand, gravel, soil, and combinations thereof. In an embodiment, the porous matrix is sand. In an embodiment, the porous matrix includes cellulose fibers, such as in the form of wood chips, wood pulp, and the like.

In an embodiment, a weight percent of the spent coffee grounds biochar is in a range of about 0.5 wt. % to about 5.0 wt. %, such as in a range of about 0.5 wt. % to about 3.0 wt. %.

In an embodiment, the environmental remediation system is disposed within a container, such as a container suitable to be deployed in soil and/or water remediation. In an embodiment, the environmental remediation system is disposed in a porous container, such as a sack or bag configured to carry or otherwise contain the biochar and the porous matrix while allowing fluid flow therethrough. In an embodiment, the environmental remediation system is disposed within a tube or pipe configured to allow fluid flow therethrough, while retaining the environmental remediation system within the tube or pipe.

In another aspect, the present disclosure provides a method of removing contaminants from an aqueous solution, the method comprising passing the aqueous solution through dried spent coffee ground biochar, thereby removing the contaminants from the aqueous solution. Such methods of removing contaminants are suitable to remove contaminants, such as organic compounds from aqueous solutions, such as storm water runoff, sewage, and combinations thereof. In an embodiment, the contaminants are selected from the group consisting of caffeine, atrazine, humic acid, diuron, and perfluorooctane sulfonate.

EXAMPLES

Example 1: Method of Producing SCG Biochar and Characterization

Biochar Production

Calgon F300 was obtained from the Calgon Carbon Corporation (Pittsburgh, PA). MCG biochar was obtained from Cal Forest Nurseries, a subsidiary of GrowPro Inc. located in Etna, CA. MCG is a waste byproduct of mixed softwood (high Ponderosa pine content) combustion energy generation at 1400° C. in a downdraft gasifier. SCG were obtained from the University of Washington Bay Laurel Catering Services (Seattle, WA) from their industrial drip coffee makers which use Starbucks® Pike Place® grounds, a medium roast, arabica coffee sourced from Latin America.

All chemicals used were certified ACS reagent grade or equivalent unless otherwise noted. High purity nitrogen gas (99.998%) purchased from Praxair (Danbury, CT) was used for char material production. SCG biochar was activated with sodium hydroxide pellets (NaOH, food grade NF/EP/BP/FCC certification) or potassium hydroxide pellets (KOH) both purchased from Fisher Scientific (Waltham, MA). Activated SCG biochar was washed with hydrochloric acid (HCl, 36.5-38%) purchased from Macron Fine Chemicals™ (VWR International, Radnor, PA). FTIR grade potassium bromide KBr for DRIFTS was obtained from Alfa Aesar (Haverhill, MA), and sodium chloride (NaCl) and nitric acid ($HNO_3$, 69%) for electrophoretic mobility (EPM) analysis were obtained from VWR Chemical. Samples prepared for EPM analysis were filtered with 0.45 μm, 25 mm diameter nylon syringe filters obtained from VWR. Stock solutions for adsorption experiments were prepared with perfluorooctanesulfonic acid potassium salt (98% purity) purchased from Sigma Aldrich (St. Louis, MO) in Optima™ liquid chromatography/mass spectrometry (LC/MS) grade Methanol purchased from Thermo Fisher Scientific. Powdered HEPES (99.5% purity by titration) purchased from Sigma Aldrich was used to buffer the batch adsorption test solutions and the pH was adjusted with 0.05 M NaOH (food grade NF/EP/BP/FCC certification). Divalent cation stock solution was prepared with calcium chloride ($CaCl_2$)) purchased from Sigma Aldrich and magnesium chloride hexahydrate ($MgCl_2$) purchased from VWR Chemical. The simulated wastewater treatment plant EfOM was prepared with bovine serum albumin lyophilized powder (96% purity), alginic acid sodium salt from brown algae (sodium alginate, low viscosity), technical grade humic acid, and octanoic acid (98% purity), all purchased from Sigma Aldrich. Adsorption samples were filtered with 0.2 μm, 25 mm diameter cellulose acetate (CA) syringe filters purchased from Sigma Aldrich or 0.2 μm, 25 mm diameter glass fiber (GF) syringe filters obtained from Foxx Life Sciences (Salem, NH). Analytical and internal PFAS standards were obtained from Wellington Laboratories (Ontario, CA). Reagent Plus® grade powdered caffeine and Pestanal® grade Diuron-d6 purchased from Sigma Aldrich were used as the analytical and internal standards for caffeine quantification in SCGKOH.

Upon receipt, F300 and MCG biochar were ground and sieved to a No. 30 (595 μm) to 50 (297 μm) mesh fractions, rinsed with deionized water until the rinse water was clear, and dried at 90° C. overnight in a VWR 1500E incubator (VWR International, Radnor, PA). The SCG were obtained directly after use, and immediately dried at 90° C. for 42 hours and stored in an air-tight container to prevent molding.

Carbonization of the SCG was achieved using a Hogentogler Protégé Split Tube Furnace (Hogentogler, Colombia, MD). The material was heated to 200° C. at 10° C./min and held there for 1 h to facilitate complete evaporation of trapped pore water. The material was then heated to 400° C., 600° C., or 800° C. at the same ramp rate and held at those temperatures for 4 h before cooling to produce the SCG400, SCG600, and SCG800 biochar, respectively. Nitrogen gas at 500 mL/min flowed through the furnace during heating and cooling to maintain oxygen poor environments.

SCG Biochar Activation with Alkaline Hydroxide

Chemical activation of the SCG400 biochar was performed with NaOH and KOH to increase surface area and improve adsorption capabilities. SCG400 was selected as a precursor material because of its high yield of particles larger than 297 μm (24%), and relatively lower energy input compared to SCG600 and SCG800 biochar (23% and 21% yield). Briefly, SCG400 was thoroughly mixed with alkaline hydroxide pellets in a quartz crucible boat with SCG400: hydroxide mass ratios of 0.5, 1.0, 1.5, and 2.0. The boat was loaded in the tube furnace, and nitrogen gas flow (500 mL/min) was started and allowed to equilibrate prior to heating. The SCG400 was heated to 200° C. at 10° C./min and held there for 1 h to evaporate residual water. The temperature was then increased to 800° C. at 10° C./min and held there for 30 min to facilitate oxidation by the alkaline hydroxide.

Following activation, the media was first rinsed with a hydrochloric acid solution (0.002-0.01%) and then with deionized water until a 30-min equilibrium solution pH of 7.0±0.5 was achieved. The activated SCG biochar was then dried at 90° C. overnight, sieved to obtain the 297-595 μm size fraction, and stored in air-tight containers until further use.

Char Physicochemical Characterization

Proximate carbon analysis (ASTM International, 2007) of F300, MCG, SCG chars and feedstock, and CHN elemental analysis of the char media were conducted to provide a better understanding of their chemical composition differences.

Briefly, triplicate samples of 0.3 g of char media were weighed and placed in ceramic crucibles. Samples were dried overnight at 100° C. with the crucible lids off and allowed to cool for at least one hour before weighing again to obtain the dry sample weight. Next, samples were heated at 900° C. for six minutes in a muffle furnace to remove the volatile matter. After 6 h, the SCG biochar samples in the ceramic crucible were allowed to cool for one hour before re-weighing. Finally, the SCG biochar samples were heated at 750° C. for 6 h to remove the fixed carbon, and then allowed to cool for at least one hour before collecting a final weight.

Elemental analysis was conducted via a two-step method. First, carbon, hydrogen, and nitrogen percentages were obtained with a Perkin Elmer (Waltham, MA) 2400 Series elemental analyzer. Second, oxygen percentage was calculated as the remainder out of 100% after contributions from carbon, hydrogen, nitrogen, and inorganic components (ash from proximate carbon analysis) were accounted for. Both proximate carbon and elemental analyses were performed using the 297-595 μm size fraction of the adsorbent material.

Caffeine release from the SCG char was evaluated to determine whether trapped caffeine in the SCG biochar could contaminate water sources during implementation. Specific surface area and pore size were evaluated via Brunauer-Emmett-Teller (BET) nitrogen adsorption at 77 K. Additional media characterization including SEM imaging, surface zeta potential measurement, and DRIFTS analysis were completed to provide information about morphology, surface charge, and surface functional groups, respectively.

Caffeine release from SCGKOH was measured via three sequential 24-h equilibration steps followed by liquid chromatography tandem mass spectrometry (LC-MS/MS) quantification of caffeine content in the equilibrium solution. Preliminary evaluations of caffeine concentrations in water and dichloromethane indicated negligible matrix effects in caffeine quantification. Thus, ultrapure water (Milli-Q systems, 18.2 MΩ-cm; Millipore Sigma, Burlington, MA) was used for all further analyses. Briefly, 10 mg of SCG char material (297-595 μm size fraction) and 5 mL of ultrapure water were combined in a 15 mL polypropylene tube and rotated at 40 rpm for 24 h. After 24 h, samples were allowed to settle for a few minutes. The supernatant was then decanted, filtered with a 0.2 μm nylon syringe filter, and placed in the refrigerator until analysis. An additional 5 mL of ultrapure water was added to the char material and the process was repeated to obtain caffeine release from a second and third wash.

TABLE 2

Caffeine content determined by LC-MS/MS, the 1, 2, and 3 designations correspond to the first, second and third washes.

| sample ID | caffeine concentration (mg/L) |
|---|---|
| SCGKOH-1 | 0.00 |
| SCGKOH-2 | 0.00 |
| SCGKOH-3 | 0.00 |

LC-MS/MS analysis was done with a Waters Corporation (Milford, MA) Quatro Micro quadrupole tandem mass spectrometer preceded by a Phenomenex (Torrence, CA) Gemini 3 μm NX-C18 110A liquid chromatography column as detailed with respect to the discussion of liquid chromatography mass spectrometry. Results are shown in TABLE 2. The first, second, and third values given represent results from analysis of the first, second, and third equilibrium solutions. Results show no caffeine in the equilibrium wash solutions from SCGKOH indicating low likelihood of caffeine leaching during water treatment applications.

Specific surface area was estimated from nitrogen adsorption data collected at 77 K with a Micromeritics (Norcross, GA) 3Flex instrument using the BET surface area method. Pore size was estimated from the same data using the BJH method while pore volume and micropore volume were estimated using the t-method. Approximately 0.1 g of sample was degassed at 300° C. for 12 h prior to data collection. Free space analysis was evaluated with helium gas following nitrogen adsorption. Results are presented in TABLE 3.

TABLE 3

BET surface area and pore surface area, volume, and diameter for the precursor and activated SCG biochar, F300, and MCG materials.

| | pore SA[2] ($m^2$/g) | | pore size[3] (nm) | |
|---|---|---|---|---|
| sample ID[1] | adsorption | desorption | adsorption | desorption |
| SCG400 | No points within BJH pore size interval | | | |
| SCG600 | | | | |
| SCG800 | 0.61 | 1.25 | 45.55 | 22.50 |
| SCGKOH | 59.40 | 52.65 | 1.42 | 1.28 |
| MCG | 175.05 | 186.16 | 2.33 | 2.17 |
| F300 | 112.92 | 121.71 | 2.21 | 2.10 |

[1]All samples analyzed were #30-#50 mesh particle size.
[2]BJH cumulative surface area of pores between 0.8500 nm and 150.0000 nm radius
[3]BJH average pore radius (2* volume/area)
SA— surface area Surface zeta potential was measured with a Zetasizer Nano ZS (Malvern Instruments, Malvern, UK). Briefly, 22.9 mg of char material fines (i.e., particles less than 297 μm) were suspended in 22.9 mL of 5 mM NaCl solution and allowed to equilibrate for 24 h. For the MCG biochar surface zeta potential measurement at pH 7.69, the pH of the solution was then brought to 7.7±0.05 through addition of 1% $HNO_3$. Prior to analysis the sample was resuspended via sonication for 10 minutes and then filtered with a 0.45 μm nylon filter. Approximately 10 mL of sample volume was wasted through the filter prior to collection of 5 mL of sample for analysis to minimize particle loss across the filter. The solution pH was measured following particle size and zeta potential analysis with a Thermo Scientific (Waltham, MA) Orion™ Star A111 pH meter equipped with an Orion™ PerpHecT™ Ross™ combination pH micro electrode. Results are recorded in TABLE 4.

TABLE 4

Particle size, poly dispersity index (PDI), zeta potential, and pH measurements for the precursor and activated SCG biochar, F300, and MCG materials

| | particle size (d · nm) | DI | zeta potential (mV) | pH |
|---|---|---|---|---|
| SCG400 | 125.8 | 0.202 | −37.8 | 7.46 |
| SCG600 | 127.1 | 0.216 | −47.0 | 7.45 |
| SCG800 | 116.4 | 0.205 | −46.2 | 7.64 |
| SCGKOH | 127.0 | 0.231 | −52.0 | 7.66 |
| F300 | 193.4 | 0.455 | −21.5 | 7.68 |
| MCG | 372.8 | 0.377 | −26.4 | 9.29 |
| | 232.4 | 0.339 | −26.2 | 7.69 |

d · nm = particle diameter in nanometers
PDI = poly dispersity index

Figure 4A:
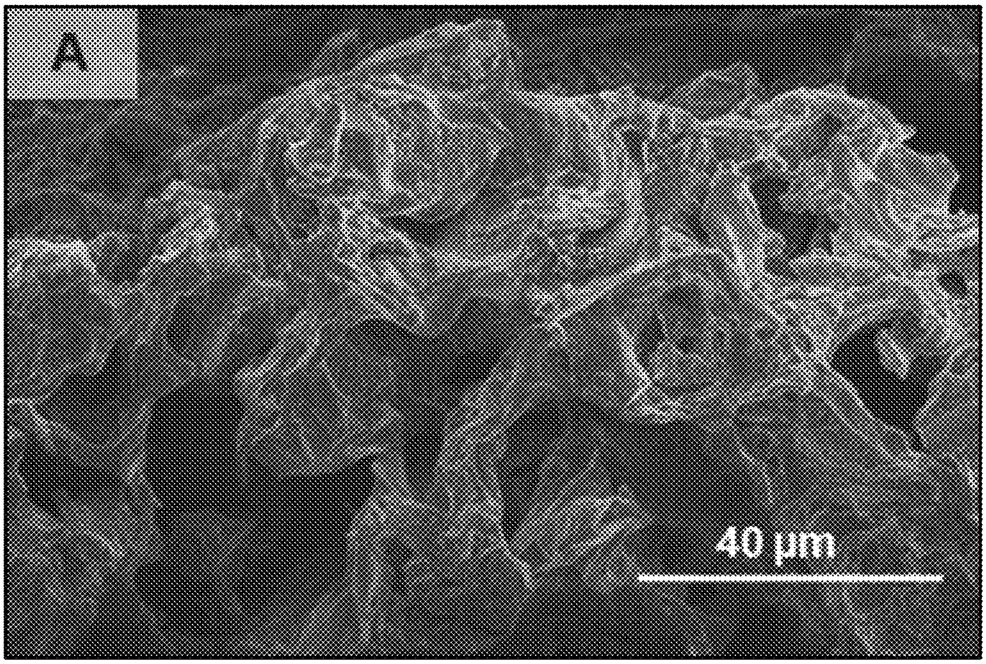
FIGS. 4A and 4B are SEM images of the SCG400 precursor at lower (4A) and higher (4B) magnification, in accordance with an embodiment of the present disclosure.
Figure 4B:
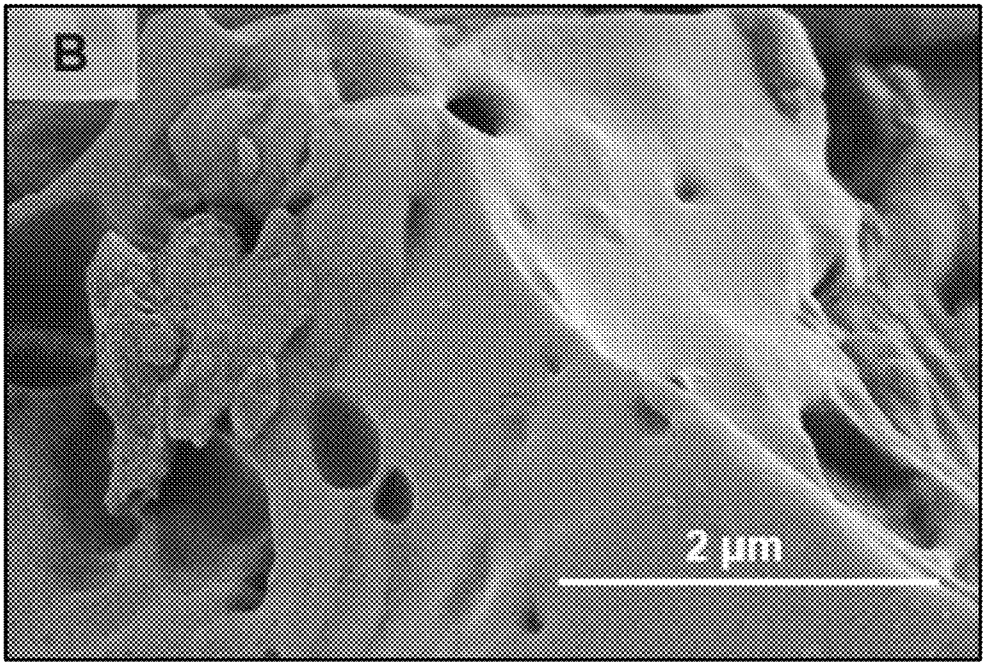

SEM imaging of the biochar and activated carbon material morphology was measured with a ThermoFisher Scientific (Waltham, MA) Apreo VP SEM instrument following platinum sputtering of the media where necessary to increase electrical conductivity. Images are shown in FIGS. 4A and 4B.

Fourier transform infrared spectra were collected for the three SCG biochar pyrolysis temperatures, SCGKOH, and MCG with the DRIFTS of the Thermo Scientific™ (Waltham, MA) Nicolet™ iSTM10 FT-IR Spectrometer. DRIFTS spectra were not collected for the F300 material as this information has been well characterized elsewhere. Samples were ground with a mortar and pestle and mixed at a 10:1 mass ratio of KBr to char material (except for MCG which used a 13:1 ratio) to optimize the signal to noise ratio. Results are displayed in FIG. 5 and indicate decreasing peak size and occurrence with increasing pyrolysis temperature and with activation for the SCG char materials. The peaks observed in these spectra are characteristic of highly aromatic carbon materials. In particular, the broad peak observed centered around 1250 cm-1 for the SCG400 and SCG600 biochar can be attributed to a C—O stretching vibration, the peaks near 1460 cm-1 and 1600 cm-1 are both attributed to aromatic C═C stretching vibrations, the peaks centered around 2900 cm-1 (2800 to 3000 cm-1) and the peak at 3050 cm-1 are attributed to aromatic C—H stretching vibration.

Batch Testing

All batch testing was done with the 297-595 μm char size fraction in 50-mL polypropylene centrifuge tubes with samples equilibrated via rotation at 40 rpm using a Fisherbrand™ Multi-Purpose Tube Rotator (Fisher Scientific, Waltham, MA).

Figure 6:
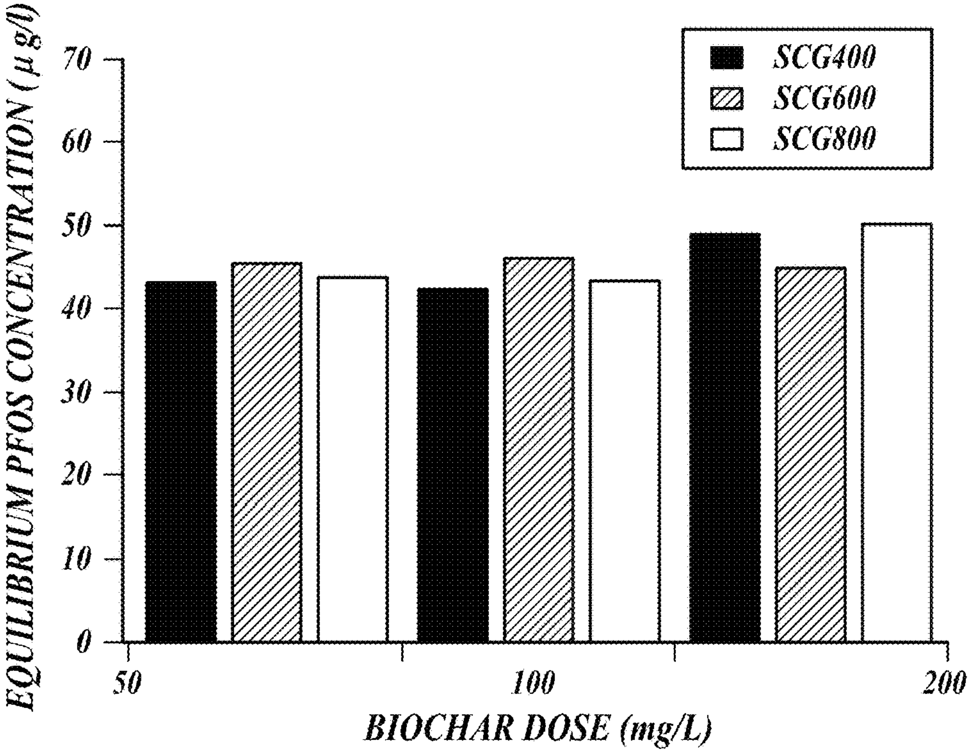
FIG. 6 illustrates equilibrium PFOS concentration from an initial concentration 46±4 μg/L PFOS over a 24-h equilibrium batch adsorption test by SCG400, an SCG precursor heated at 600° C. (SCG600), and an SCG precursor heated at 800° C. (SCG800) at solid (mg biochar) to liquid (L of PFOS solution) ratios of 50, 100, and 200, in accordance with an embodiment of the present disclosure.

Preliminary evaluation of PFOS adsorption on the precursor was conducted and showed little PFOS adsorption on any of the precursor materials (FIG. 6). Preliminary evaluation of PFOS adsorption was performed with the three pyrolyzed SCG biochar (SCG400, SCG600 and SCG800) to evaluate their PFOS removal capability and to determine to optimal solid:liquid ratios for future adsorption studies. A PFOS stock solution in methanol was used to prepare 50 mL of 46±4 μg/L PFOS in ultrapure water with variable biochar masses to achieve solid:liquid ratios of 50, 100, and 200 mg/L in 50-mL polypropylene centrifuge tubes. Methanol concentrations of no more than 0.2% were maintained in this and subsequent batch tests. This residual methanol is not expected to significantly impact the adsorption processes. Triplicate samples were prepared for each material and rotated at 40 rpm on a Fisherbrand™ (Waltham, MA) multipurpose tube rotator for 24 h. Equilibrated batch test samples were filtered with a 0.20 μm cellulose acetate syringe filter with 20 mL of sample wasted through the filter prior to collection of 5 mL for analysis. Results are displayed in FIG. 6.

After SCG400 activation with various mass ratios of NaOH or KOH, 24-h batch adsorption tests were conducted with 100 mg/L char dose to evaluate their removal capabilities (FIG. 1). Briefly, 5.0 mg of adsorbent was added to 50 mL of ultrapure water in 50-mL polypropylene centrifuge tubes and spiked with PFOS stock solution in methanol to obtain an initial PFOS concentration of 44±13 μg/L.

Several filtration options were evaluated for batch adsorption samples to identify a method that would minimize PFOS losses. Two types of filter materials previously shown to result in low PFAS losses were tested: CA and GF. Both types of filters were 0.2 μm syringe filters, 25 mm in diameter. PFOS loss filtration tests were conducted using 50 mL of ultrapure water in a 50-mL polypropylene tube with initial PFOS concentrations of approximately 5, 50, and 500 μg/L obtained through spiking with concentrated PFOS stock in methanol while maintaining a volumetric methanol concentration in water of no greater than 0.2%. Triplicate samples of each PFOS concentration were rotated at 40 rpm for 5 to 10 minutes after PFOS addition to ensure adequate mixing, and a 500 μL aliquot was then removed to be used as a non-filtered control. Filters were pre-wet with 5 mL of ultrapure water and then approximately 20 mL of sample was wasted through each filter prior to collection of 2 to 3 mL of sample to be used for analysis. The same filter was used for replicates of each concentration, and filters were washed with 20 mL of each new sample before collection of aliquots for analysis. PFOS quantification was done with LC-MS/MS as described in further herein.

PFOS loss was calculated as the percent difference between the filtered and non-filtered samples, and results are shown in TABLE 5. Although the GF filter performed well at high concentrations (i.e., negligible PFOS loss across the filter), performance decreased at lower concentrations (14.5% loss at 31.69 μg/L) leading to issues with recovery of sufficient PFOS for sample analysis around 5 μg/L. The CA filter, by contrast, showed more consistent PFOS loss (around 13%) at higher concentrations with decreased loss at low concentrations (1.4% loss at 3.11 μg/L).

Sample purification via centrifugation was also attempted and results were compared to the CA and GF filtration results. Briefly, 5 mg of MCG biochar was added to triplicate samples of 50 mL of ultrapure water in a 50-mL polypropylene tube and spiked with 50 μg/L of PFOS from a concentrated methanol stock. MCG char was chosen for this test because it had significantly more fines observed during sieving and washing than either the F300 or the SCGKOH and thus seemed most likely to exhibit challenges with removal of small particles from solution during centrifugation. A set of control samples without MCG were prepared in the same manner. Samples were rotated at 40 rpm for 24 h to equilibrate and then a 500 μL aliquot was removed from the control samples for a non-centrifuged control. Samples were then centrifuged for 10 minutes at 2300 rpm to remove the large biochar particulates and a 1000 μL aliquot was removed from the center of the supernatant (to avoid floating char particles) and added to a 15-mL polypropylene tube. The aliquot was then diluted with 900 μL of methanol and centrifuged at 4000 rpm for 10 minutes. The supernatant was then divided into a 950 μL volume placed in an LC-MS vial for future analysis and a 950 μL volume placed in a capped and parafilm-sealed test tube in the refrigerator for SEM imaging to evaluate the char removal capabilities of this method. Briefly, a 1×0.5 inch silicon wafer was washed with ethanol and allowed to dry in a dust free area. A 5 μL drop of each MCG sample was placed on the mirrored side of the wafer and allowed to dry in a dust free area for SEM analysis.

Results from the PFOS analysis of the centrifuged and non-centrifuged ultrapure water sample showed negligible PFOS loss from centrifugation (TABLE 5). However, SEM imaging indicated the presence of a significant amount of both fine MCG particulates and those greater than 0.2 μm in diameter, making this a non-viable option for char removal from PFOS adsorption testing with char material adsorbents. Therefore, the CA filtration method, including pre-wetting of the filter material and wasting of 20 mL of sample prior to collection of an aliquot for analysis, was selected and used for the kinetics, isotherm, and effluent organic matter and divalent cation effects tests.

TABLE 5

PFOS losses during sample purification via centrifugation and filtration with glass fiber or cellulose acetate membranes.

| purification method | concentration (ppb) | % loss |
|---|---|---|
| glass fiber | 31.69 | 14.2% |
| | 422.09 | −0.5% |
| cellulose acetate | 4.11 | 1.4% |
| | 31.79 | 13.9% |
| | 369.77 | 12.0% |
| centrifugation | 37.64 | −3.7% |

The activated SCG400 biochar produced with 50 wt % KOH was selected for additional batch testing because of its good PFOS removal capabilities and comparatively low chemical input requirements. The activated SCG400 is henceforth identified as SCGKOH. Production and PFOS adsorption evaluation were repeated with a second SCG-KOH material produced with a different batch of spent coffee grounds (SCGN; collected approximately 8 months after the first batch). Results show little difference in PFOS removal between SCGKOH batches, confirming the reproducibility of the pyrolysis and activation processes.

PFOS batch adsorption kinetics onto SCGKOH, F300, and MCG were evaluated over 5 days using triplicate, sacrificial samples for each time step. Approximately 5 mg of activated carbon was added to 50 mL of ultrapure water (Milli-Q systems, 18.2 MΩ-cm) and spiked with PFOS to obtain an initial PFOS concentration of 245±20 μg/L. To control the solution pH and eliminate the effect of varying pH on PFOS adsorption, a HEPES buffer was added at 5 mM, and the initial pH was adjusted to 7.0±0.1 with 0.05 M NaOH. Samples were collected at various time points, filtered, and analyzed for PFOS adsorption. Kinetics data was fit to linear and non-linear pseudo first order, and linear pseudo second order kinetics models.

Batch adsorption isotherm tests were conducted with SCGKOH, F300, and MCG and fitted to the Langmuir and Freundlich isotherm models. Approximately 5 mg of activated carbon was added to 50 mL of ultrapure water and spiked with PFOS stock to obtain triplicate samples with initial PFOS concentrations between 2 and 8900 μg/L. HEPES buffer addition and pH adjustment were conducted as described above. Samples were equilibrated for 5 days before filtration and PFOS quantification.

Simulated Effluent Organic Matter, Divalent Cation Solution, and Hepes Buffer

Effects of representative divalent cations (i.e., 26 mg/L calcium as $CaCl_2$) and 12 mg/L magnesium as $MgCl_2$) in the presence and absence of simulated wastewater EfOM on PFOS removal by SCGKOH, F300, and MCG were evaluated with 24-h batch testing at an initial PFOS concentration of 340±23 μg/L to inform evaluation of material performance for water treatment applications.

Briefly, four representative compounds, bovine serum albumin (2.5 mg/L), sodium alginate (2 mg/L), octanoic acid (0.5 mg/L), and humic acid (5 mg/L) were chosen to mimic the protein, carbohydrate, fat, and humic composition of typical EfOM. Stock solutions of BSA, sodium alginate, and humic acid were prepared by mixing 20 mg of powdered compound in 20 mL of ultrapure water, covering with parafilm, and mixing for 24-hours. Total organic carbon (TOC) concentrations of each stock solution were measured with a Shimadzu (Kyoto, Japan) TOC-L analyzer. The divalent cations, $Ca^{2+}$ and $Mg^{2+}$, were added at concentrations of 26 mg/L (0.65 mM) and 12 mg/L (0.5 mM), respectively to mimic concentrations typically present in wastewater treatment plant effluent.

Figure 7:
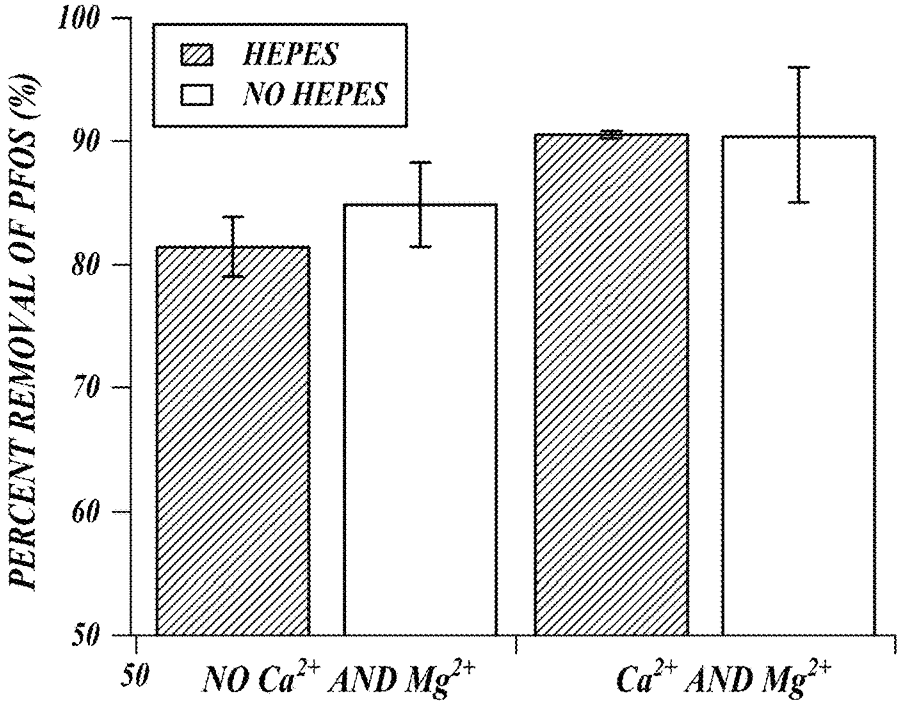
FIG. 7 illustrates a percent removal of 91±8 μg/L PFOS by 100 mg/L SCGKOH with and without calcium (26 mg/L) and magnesium (12 mg/L) ions in the presence and absence of 5 mM HEPES buffer, in accordance with an embodiment of the present disclosure.

The effect of HEPES buffer on PFOS adsorption was evaluated for the SCGKOH in the presence of divalent cations to confirm minimal interference by the buffer. HEPES was chosen as a buffer compound for: (1) its circumneutral pKa (7.0) which is typical of the mid-range pH values associated with wastewater treatment plant effluent (i.e., the focus of this study); (2) its lack of reaction with other species in the batch test aquatic matrices as predicted by Visual MINTEQ; and, (3) its use in similar prior studies as an appropriate buffer for complex aqueous systems containing divalent cations. Briefly, 5 mg of SCGKOH was added to 50 mL of ultrapure water in a 50-mL polypropylene tube. An initial PFOS concentration of 91±8 μg/L was achieved by spiking with a concentrated PFOS stock in methanol. Where applicable, HEPES was added at 5 mM and divalent cations were added at 26 mg/L of $Ca^{2+}$ (0.65 mM) and 12 mg/L of $Mg^{2+}$ (0.5 mM). Triplicate samples were rotated at 40 rpm for 24 h before filtration and LC-MS sample preparation as described previously. Results are shown in FIG. 7 and indicate improved adsorption of PFOS in the presence of divalent cations and minimal effect of the HEPES buffer on PFOS adsorption.

Liquid Chromatography Mass Spectrometry Methodology

Figure 8A:
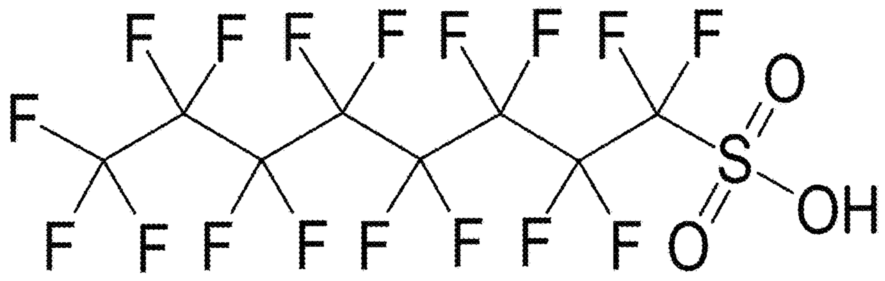
FIG. 8A provides the chemical structure for PFOS.

PFOS ($C_8F_{17}SO_3$; FIG. 8A) was analyzed with a Waters (Milford, MA) Quattro Micro API triple quadrupole tandem mass spectrometer (MS/MS) preceded by liquid chromatography (LC) using an Agilent (Santa Clara, CA) Zorbax Rapid Resolution Eclipse XBD-18C column (2.1×50 mm, 1.8 μm). An Agilent, XDB-C18 guard cartridge (80 Å, 4.6×12.5 mm, 5 μm) was placed before the LC column to pre-filter the sample. The MS/MS operation mode was set to negative electrospray ionization with multiple reaction monitoring (MRM) transitions (TABLE 6). The LC was operated with a stationary phase of HPLC grade water with 10 mM ammonium acetate (A) and a mobile phase of HPLC grade methanol with 10 mM ammonium acetate (B). Details of the gradient program are given in TABLE 7. Mass labeled PFOS (mPFOS) was used as an internal standard. Calibration standards and samples were prepared with 50:50 volumetric ratio of methanol and water to minimize PFOS losses to the tube walls.

Figure 8B:
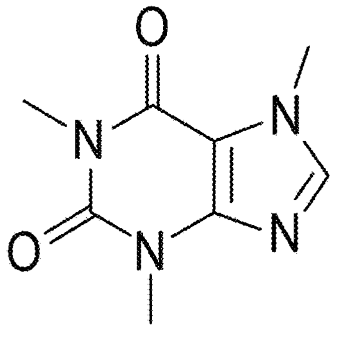
FIG. 8B provides the chemical structure caffeine.
Figure 9A:
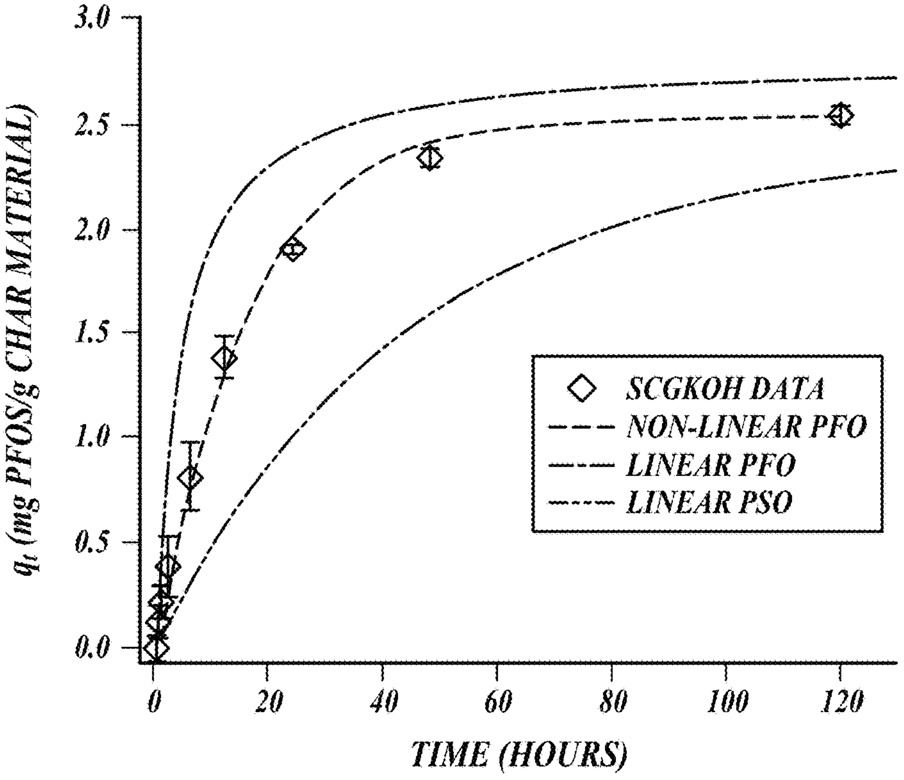
FIGS. 9A-9C illustrates kinetics modeling of PFOS adsorption rates onto (9A) SCGKOH, (9B) F300, and (9C) MCG with the Langmuir-derived non-linear pseudo first order, linear pseudo first order, and linear pseudo second order models, in accordance with an embodiment of the present disclosure, which is summarized in the table of FIG. 9D.
Figure 9B:
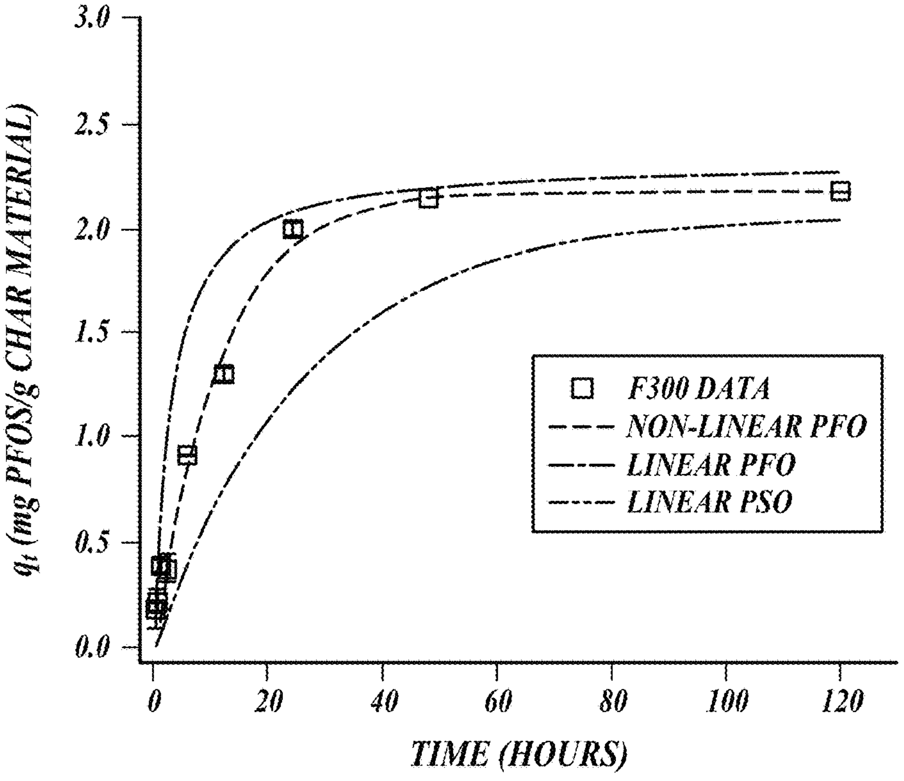
Figure 9C:
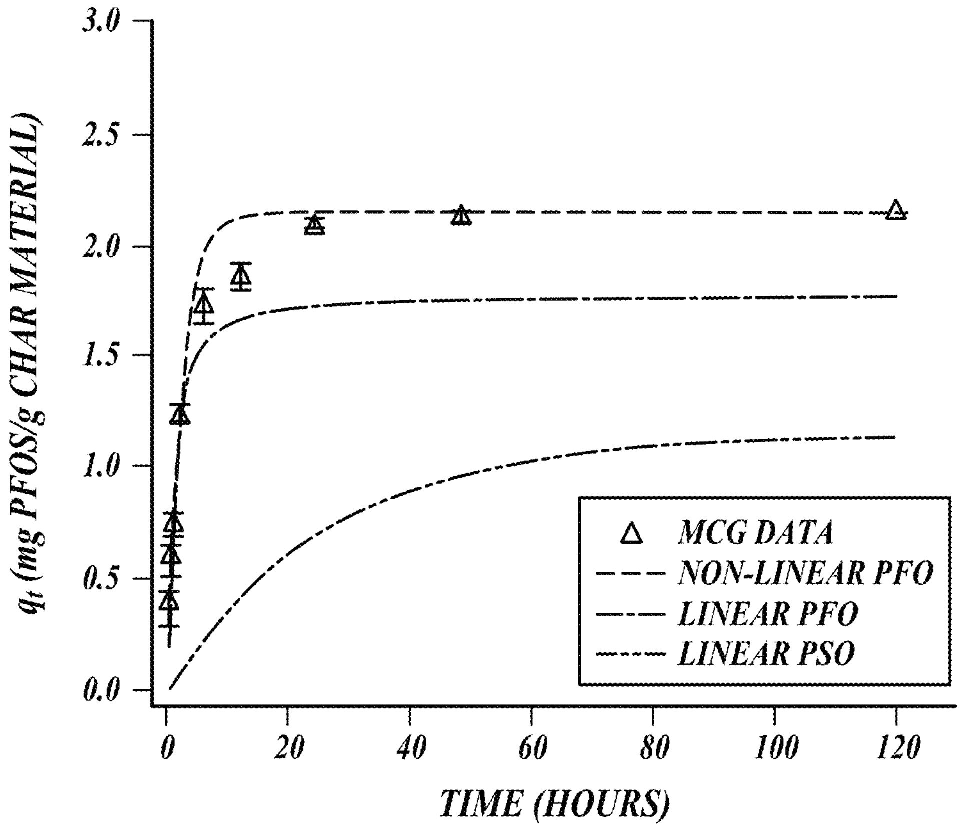

Caffeine ($C_8H_{10}N_4O_2$; FIGS. 8A and 8B) was analyzed with a Waters Corporation (Milford, MA) Quattro Micro quadrupole tandem mass spectrometer (MS/MS) preceded by a Phenomenex (Torrence, CA) Gemini 3 μm NX-C18 110A (3×50 mm) liquid chromatography column. The MS operation mode was set to positive electrospray ionization with MRM transitions (TABLE 6). The LC was operated with a stationary phase of acetonitrile and methanol at a 50:50 volumetric ratio (A) and a mobile phase of 10 mM ammonium acetate in HPLC grade water (B). Details of the gradient program are given in TABLE 8. Diuron-d6 was used an internal standard. All liquid chemicals used in LC-MS/MS analysis of PFOS and caffeine were Optima® LCMS Grade and the Ammonium Acetate was certified ACS Grade (98.1% purity), all purchased from Fisher Chemical (Hampton, NH).

TABLE 6

LC-MS/MS parameters used for quantification of PFOS and caffeine.

| | ionization mode | parent (m/z) | product ion (m/z) | cone energy (V) | collision energy (V) | RT (min) |
|---|---|---|---|---|---|---|
| PFOS | − | 498.95 | 79.40 | 53 | 40 | 9.808 |
| PFOS | − | 498.95 | 98.50 | 53 | 35 | 9.840 |
| PFOS | − | 503.10 | 79.40 | 53 | 40 | 9.800 |
| Caffeine | + | 195.15 | 138.15 | 32 | 23 | 3.17 |
| Caffeine | + | 195.15 | 110.15 | 32 | 20 | 3.17 |
| Diuron-d6 | + | 239.15 | 52.05 | 27 | 15 | 5.33 |
| Diuron-d6 | + | 239.15 | 52.05 | 27 | 18 | 5.33 |

TABLE 7

LC gradient program for elution of PFOS using 10 mM ammonium acetate in water and methanol as the stationary and mobile phases.

| time (min) | % A (10 mM ammonium acetate) | % B (10 mM ammonium acetate in methanol) | flow rate (mL/min) |
|---|---|---|---|
| 0.0 | 80 | 20 | 0.4 |
| 8.0 | 5 | 95 | 0.4 |
| 10.0 | 5 | 95 | 0.4 |
| 10.5 | 80 | 20 | 0.4 |
| 16.0 | 80 | 20 | 0.4 |

TABLE 8

LC gradient program for elution of caffeine using acetonitrile and methanol (50:50 v/v ratio) as the stationary phase, and 10 mM ammonium acetate in water as the stationary phase.

| time (min) | % A (acetonitrile and methanol 50:50 v/v) | % B (10 mM ammonium acetate) | flow rate (mL/min) |
|---|---|---|---|
| 0.0 | 90 | 10 | 0.2 |
| 1.5 | 45 | 55 | 0.2 |
| 4.0 | 36 | 64 | 0.2 |
| 5.0 | 1 | 99 | 0.2 |
| 7.0 | 1 | 99 | 0.2 |
| 7.5 | 90 | 90 | 0.3 |
| 10.0 | 90 | 90 | 0.2 |

Kinetics Model Calculations

Three models were employed to evaluate the kinetic PROS adsorption data for the SCGKOH, F300, and MCG.

The first two were linear fits of the pseudo first order (PPO) and pseudo second order (PSO) kinetic models, commonly used to describe adsorption kinetics for a range of adsorbent materials and contaminants. Pseudo-alpha-order reactions are those that in actuality depend on the concentrations of multiple reactants but in practice are assumed to depend on the concentration of only one reactant (i.e., PFOS) because the others are present in excess. The equations for these models are as follows:

$$\frac{dq_t}{dt} = k_1(q_e - q_t) \quad \text{Eq. (A.1)}$$

$$\ln(q_e - q_t) = \ln(q_e) - k_1 t \quad \text{Eq. (A.2)}$$

$$\frac{dq_t}{dt} = k_2(q_e - q_t)^2 \quad \text{Eq. (A.3)}$$

$$\frac{t}{q_t} = \frac{1}{k_2 q_e^2} + \frac{t}{q_e} \quad \text{Eq. (A.4)}$$

where $q_t$ and $q_e$ are the PFOS adsorption density at time t and at equilibrium in mg PFOS/g char material; t is time in hours; and $k_1$ and $k_2$ are the PFO and PSO kinetic rate constants.

For the linear PFO model, a graph of the natural log of ($q_e$−$q_t$) was plotted as a function of time, and the equilibrium adsorption capacity ($q_e$) was evaluated as the adsorption capacity at five days to calculate the y-variables. The rate constant ($k_1$) and equilibrium adsorption capacity ($q_e$) were then determined using Eq. (A.2) and the slope and intercept of this graph. For the linear PSO model, a graph of t/q versus time was plotted, and the rate constant ($k_2$) and equilibrium adsorption capacity ($q_e$) were then solved using Eq. (A.4) and the slope and intercept of this graph.

A modified non-linear PFO model derived from the Langmuir kinetic adsorption model (Eq. A.5) was the third model used to fit the PFOS adsorption data for all three char materials. The relevant equations for this model are as follows:

$$\frac{d\theta_t}{dt} = k_a C_t(1-\theta_t) - k_d\theta_t = k_1(\theta_e - \theta_t) + k_2(\theta_e - \theta_t)^2 \quad \text{Eq. (A.5)}$$

$$\frac{k_1}{k_2} = \frac{\sqrt{K_L^2(C_0 - q_{max}X)^2 + 2K_L(C_0 + q_{max}X) + 1}}{K_L q_{max} X} \quad \text{Eq. (A.6)}$$

$$\theta_e = \frac{K_L(q_{max}X + C_0) + 1 - \sqrt{K_L^2(C_0 - q_{max}X)^2 + 2K_L(C_0 + q_{max}X) + 1}}{2K_L q_{max} X} \quad \text{Eq. (A.7)}$$

$$\theta_t = \theta_e\left(1 - e^{-k_1 t}\right) \quad \text{Eq. (A.8)}$$

$$\theta_t = \frac{(C_e - C_t) * M_{ads}}{q_{max}} = \frac{q_t}{q_{max}} \quad \text{Eq. (A.9)}$$

where $\theta_t$ and $\theta_e$ are the fraction of PFOS adsorption sites occupied at time t and at equilibrium; t is time in hours; $k_a$, $k_d$, $k_1$, and $k_2$ are the adsorption and desorption, and first and second order kinetic rate constants, respectively; $K_L$ is the Langmuir adsorption constant; $q_{max}$ is the maximum adsorption capacity determined by the Langmuir adsorption isotherm; X is the concentration of adsorbent (g/L); $C_0$, $C_e$, and $C_t$ are the PFOS concentration at time zero, equilibrium, and time t, respectively; and Mads is the mass (g) of adsorbent. Liu and Shen determined that if the ratio of $k_1/k_2$ is greater than or equal to Ge, the Langmuir kinetic model reduces to the PFO model; if the ratio of $k_1/k_2$ is instead much smaller than $\theta_e$, the Langmuir model reduces to the PSO model; and for all other conditions, the full Langmuir kinetic model applies. This relationship was evaluated for the kinetic adsorption data from the SCGKOH, F300, and MCG adsorbents using Eq. (A.6) and Eq. (A.7), and the PFO derivation of the Langmuir kinetic model (Eq. A.8) was found to be accurate for all three materials at PFOS concentrations below 3200, 3100, and 5200 μg/L for SCGKOH, F300, and MCG, respectively. The non-linear PFO derivation of the Langmuir kinetic model was applied for all three char materials using Eq. (A.8). Briefly, the value for $\theta_e$ can be solved from the Langmuir adsorption isotherm parameters as shown in Eq. (A.7) while experimental values for $\theta_t$ can be solved from experimentally determined PFOS solution concentrations using Eq. (A.9). The rate constant ($k_1$) was solved using the Microsoft Excel® solver function to minimize the square error between experimental and theoretical values of $\theta_t$. The goodness of fit of the linear PFO and PSO and the non-linear PFO kinetic models were compared using the square error as shown in FIGS. 9A-9D.

Adsorption Isotherm Model Calculations

Adsorption isotherm data for the three char materials were fit to both the Langmuir and Freundlich adsorption isotherm models whose original and linear forms are given below as Eq. (A.10) through Eq. (A.13):

$$q_e = \frac{q_{max} K_L C_e}{1 + K_L C_e} \quad \text{Eq. (A.10)}$$

$$\frac{C_e}{q_e} = \frac{1}{q_{max}} C_e + \frac{1}{K_L q_{max}} \quad \text{Eq. (A.11)}$$

$$q_e = K_F C_e^{1/n} \quad \text{Eq. (A.12)}$$

$$\log(q_e) = \frac{1}{n}\log(C_e) + \log(K_F) \quad \text{Eq. (A.13)}$$

where $q_e$ and $q_{max}$ were the equilibrium and maximum adsorption densities, $C_e$ is the equilibrium adsorbate concentration, $K_L$ and $K_F$ are the Langmuir and Freundlich adsorption rate constants, respectively, and 1/n is the Freundlich coefficient of non-linearity.

For both models, experimental data was transformed to the appropriate linear variables shown in Eq. (A.11) and (A.13) and plotted to obtain linear isotherm values for the model parameters ($q_{max}$ and $K_L$ for the Langmuir model and $K_F$ and 1/n for the Freundlich model) from the slope and intercept of the plotted data. Non-linear isotherm values for the model parameters were also obtained through minimization of the square error between experimentally and theoretically derived equilibrium adsorption densities ($q_e$) using the Microsoft Excel® solver function. Theoretical values for $q_e$ were obtained using Eq. (A.10) and (A. 12) with the linearly derived isotherm values as starting points. In all cases the non-linear model parameters provided a better fit for the data and were used for all further analysis and discussion.

Results and Discussion

Increased Surface Area Through Alkaline Activation

Physicochemical characterization of the SCG materials indicate carbonization (i.e., increased fixed carbon content via elimination of volatile carbon) predominantly occurred in the initial pyrolysis step while a dramatic increase in surface area occurred in the second activation step. The SCG feedstock had a low fixed carbon content (17.0%) and a high volatile carbon content (81.9%, TABLE 1). After pyrolysis, the relative composition reversed with a fixed carbon content of 71.1% (SCG400) to 87.1% (SCG800) and a volatile carbon content of 25.2% (SCG400) to 7.9% (SCG800). The pyrolyzed SCG had low surface areas with the SCG400 having a surface area of 3 $m^2/g$ prior to activation and 858 $m^2/g$ after activation.

The char materials used for PFOS adsorption experiments displayed comparable elemental composition characterized by high fixed carbon content. For example, the SCGKOH fixed carbon (84.8%) and ash content (3.9%) were comparable to that of F300 (83.0% and 6.8%) and MCG (83.5% and 5.0%, TABLE 1). As expected, the proximate carbon results for F300 were similar to previously reported values indicating minimal compositional change following grinding and washing processes. The SCGKOH displayed noticeably higher nitrogen content (2.17%) than either F300 (0.72%, reported elsewhere) or MCG (<0.005%), potentially indicating the presence of nitrogen-containing functional groups (e.g., —$NH_2$ moieties) which have been shown to contribute to contaminant adsorption.

Figure 5:
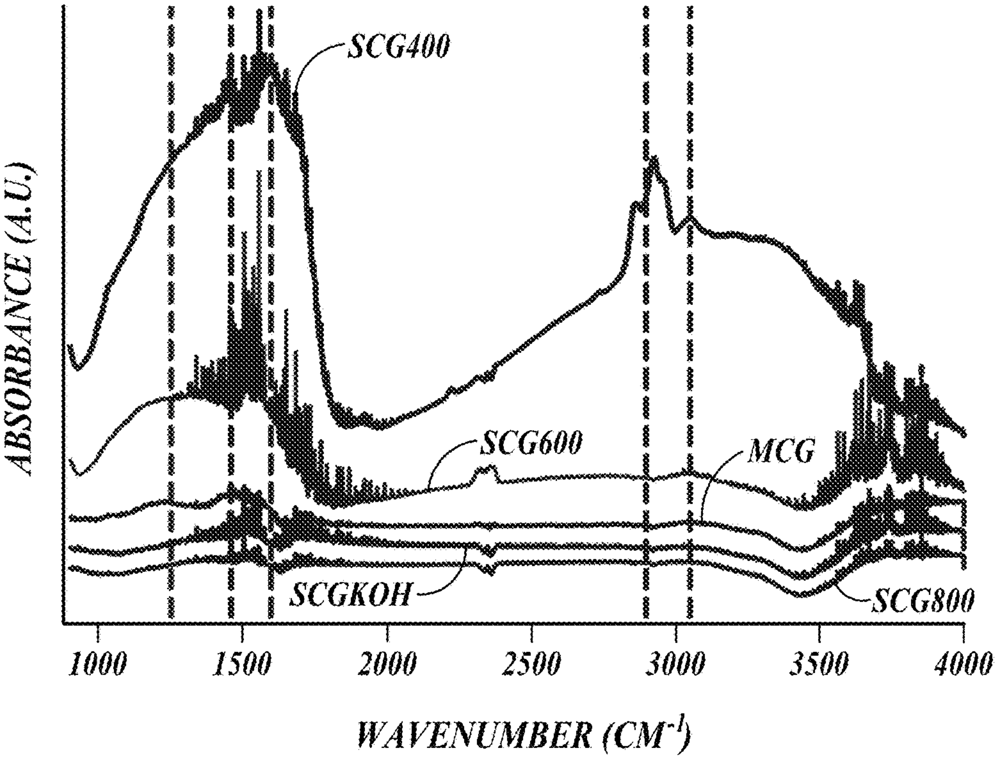
FIG. 5 provides diffuse reflectance infrared Fourier transform spectroscopy (DRIFTS) Fourier transform infrared spectroscopy (FTIR) spectra of activated and precursor SCG biochar, and the MCG biochar where a ratio of potassium bromide (KBr) to biochar was 10:1 for all SCG char materials and 13:1 for the MCG, in accordance with an embodiment of the present disclosure.

SCGKOH, F300 and MCG chars were characterized by high specific surface area and small average pore size (TABLE 1 and TABLE 3), indicative of high adsorption capacity. Additionally, the char materials had a negative surface charge (TABLE 4) and limited identifiable DRIFTS surface functional groups (FIG. 5). Both of these physicochemical properties are characteristic of materials with a high aromatic carbon content, which is suitable for hydrophobic interactions with the hydrophobic C—F PFOS backbone (chemical structure in FIG. 8A).

TABLE 1

Elemental composition and proximate carbon analysis of all SCG chars, F300 and MCG materials.

| sample ID[1] | BET SA ($m^2/g$) | pore size[3] (nm) | elemental analysis[4,5] C % | H % | N % | O %[6] | proximate carbon analysis[5] VC % | FC % | Ash % |
|---|---|---|---|---|---|---|---|---|---|
| SCG | NA | NA | NA | NA | NA | NA | 81.9 ± 0.3 | 7.0 ± 0.3 | 1.1 ± 0.0 |
| SCG400 | 3 | — | 75.11 ± 0.55 | 4.24 ± 0.14 | 4.16 ± 0.05 | 2.76 | 25.2 ± 0.4 | 1.1 ± 0.4 | 3.7 ± 0.0 |
| SCG600 | 7 | — | 79.56 ± 0.37 | 1.84 ± 0.08 | 3.86 ± 0.03 | 0.62 | 12.0 ± 0.5 | 3.7 ± 0.3 | 4.3 ± 0.2 |
| SCG800 | 13 | 45.55 | 79.12 ± 0.79 | 1.15 ± 0.06 | 3.73 ± 0.22 | 1.35 | 7.9 ± 0.2 | 7.1 ± 0.1 | 5.0 ± 0.2 |
| SCGKOH | 858 | 1.42 | 81.42 ± 2.26 | 0.76 ± 0.02 | 2.17 ± 0.06 | 2.23 | 11.4 ± 0.7 | 4.8 ± 0.6 | 3.9 ± 0.2 |
| F300[2] | 1060 | 2.45 | 87.37[2] | 0.17[2] | 0.72[2] | 4.59[2] | 5.0 | 3.0 | 6.8 |
| MCG | 801 | 2.21 | 81.33 ± 0.31 | 1.21 ± 0.05 | ND | 2.82 | 11.5 ± 0.2 | 3.5 ± 0.3 | 5.0 ± 0.5 |

[1]Samples were 297-595 μm size fraction.
[2]F300 elemental analysis data from the Ulrich et al. (2015).
[3]BJH average pore radius
[4]Elemental analysis conducted on a wet-mass basis.
[5]Values are the average of triplicate samples plus or minus the 95% confidence interval (with the exception of F300).
[6]Oxygen composition calculated as 100% minus C, H, N, ash contributions.
SA—surface area;
NA—not analyzed;
ND—not detected, detection limit was 0.005%;
VC—volatile carbon;
FC—fixed carbon Adsorption Kinetics Suggest Linear Driving Force PPOS adsorption kinetics data were fit to PPO and PSO models (frequently used to describe liquid-to-solid adsorption) to obtain information about the PROS uptake rates and dynamic adsorption. The non-linear PFO model derived from the Langmuir kinetic model described by Liu and Shen provided a better fit for all three char materials than the linear PFO and linear PSO models (FIGS. 9A-9D). Application of the PFO model suggests PFOS adsorption is best described by a linear driving force; while the better fit of the non-linearized model corroborates previous findings that the log transformation required for PFO model linearization decreases the model's ability to accurately predict adsorption processes. The SCGKOH, F300, and MCG chars showed fast initial PFOS uptake rates with over 70% PFOS removal within 24 h (FIGS. 1, 2A, 2C, and 2E). The MCG in particular exhibited rapid adsorption kinetics ($k_{1,\ MCG}$= 0.414 $h^{-1}$) with the majority of adsorption occurring within the first 6 h and equilibrium attained within 24 h. The long pores within MCG (FIGS. 1 and 2E) may contribute to this by providing shorter diffusion distances for PFOS molecules to inner pore spaces. The SCGKOH and F300 possessed slower initial adsorption rates ($k_{1,\ SCGKOH}$=0.062 $h^{-1}$ and $k_{1,\ F300}$=0.090 $h^{-1}$), both reaching equilibrium around 48 hours and having a more uniform uptake rate throughout the initial 48 hours. This similarity in PFOS removal rates suggests SCGKOH is a promising candidate to replace commercial activated carbon during water treatment where adsorption time is often constrained by operational parameters.

Monolayer and Heterogeneous Binding of PFOS on Chars

Langmuir and Freundlich isotherm models fit to SCGKOH, F300, and MCG PFOS adsorption data suggest adsorption was characterized by both monolayer adsorption to homogeneous binding sites (i.e., more dominant mechanism) and multilayer adsorption to heterogeneous binding sites (FIGS. 1, 2B, 2D, and 2F). SCGKOH, F300, and MCG exhibited correlation coefficients ($R^2$) greater than 0.9 for both isotherm models (FIG. 2G). Visual inspection of the data indicates adsorption on SCGKOH and F300 more closely follow a monolayer (Langmuir) scheme—particularly for data points at higher equilibrium PFOS concentrations—while the MCG adsorption data is equally well described by the Langmuir and Freundlich model, which denotes multilayer adsorption to sites with heterogeneous affinities for PFOS. The heterogeneity of MCG adsorption sites could account for its more rapid PFOS uptake compared to SCGKOH and F300.

Figure 2A:
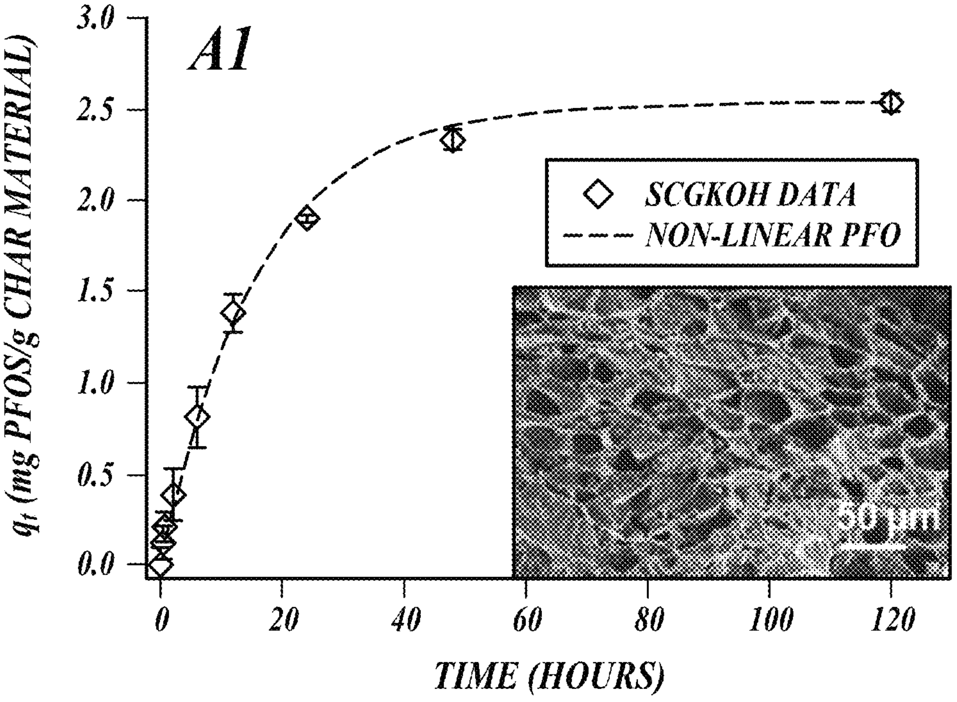
FIGS. 2A, 2C, and 2E illustrate batch kinetics results of 245±20 μg/L PFOS adsorption onto 100 mg/L (2A) an SCG pyrolyzed with caustic (SCGKOH), (2C) Carbon™ Filtrasorb® (F300) and (2E) Mountain Crest Gardens biochar (MCG) fit to the Langmuir kinetics-derived non-linear pseudo first order model with low magnification scanning electron microscopy (SEM) image insets, where error bars represent standard deviation of triplicate samples.
Figure 2B:
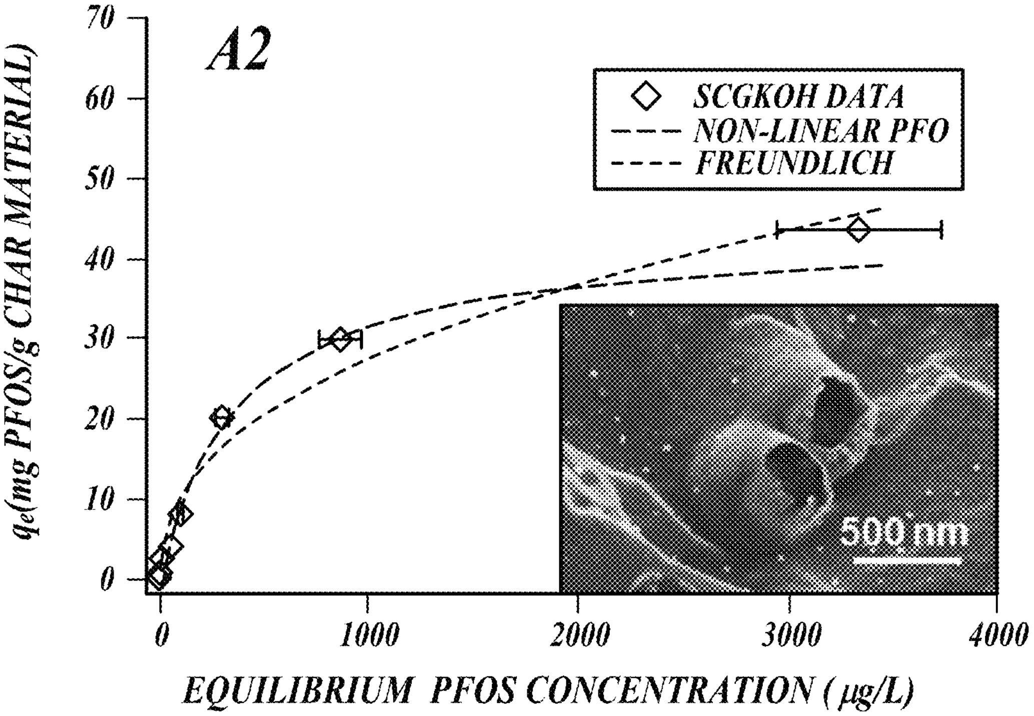
FIGS. 2B, 2D, and 2F illustrate isotherm PFOS adsorption data for (2B) SCGKOH, (2D) F300 and (2F) MCG after a 5-d equilibrium fit to Langmuir and Freundlich models with high magnification SEM image insets, in accordance with an embodiment of the present disclosure, where error bars represent standard deviation of triplicate samples.
Figure 2C:
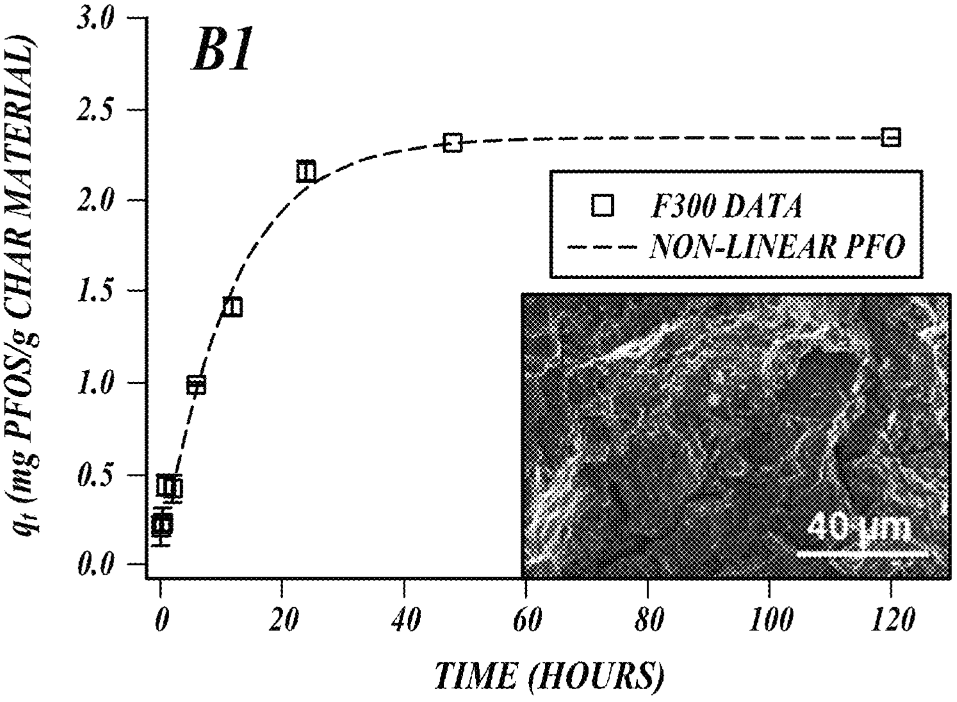
Figure 2D:
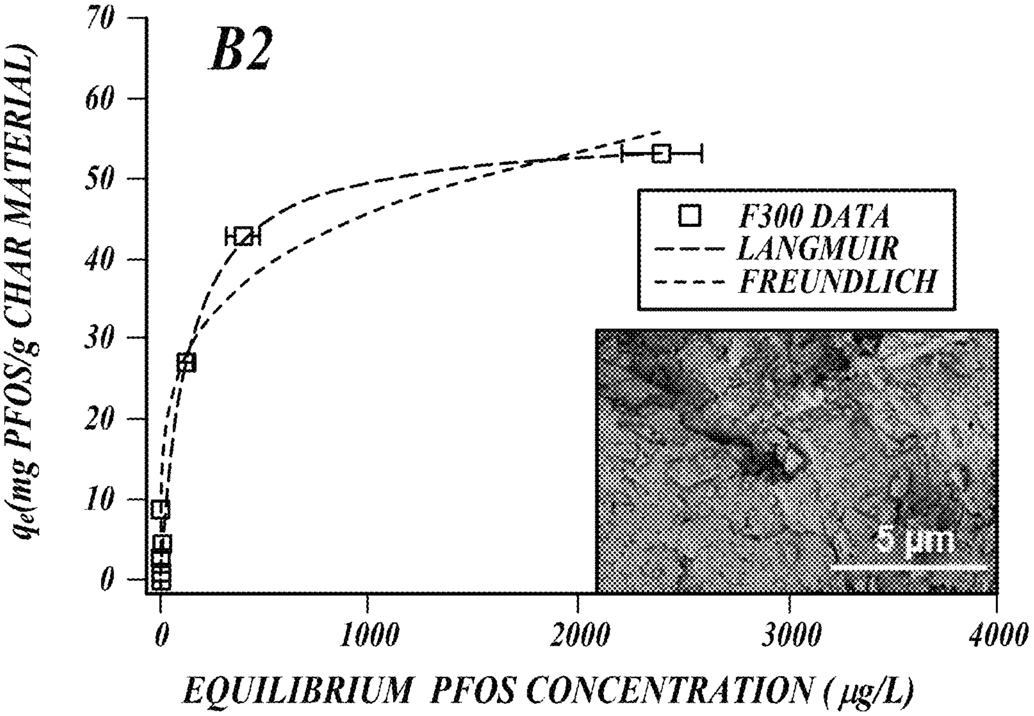
Figure 2E:
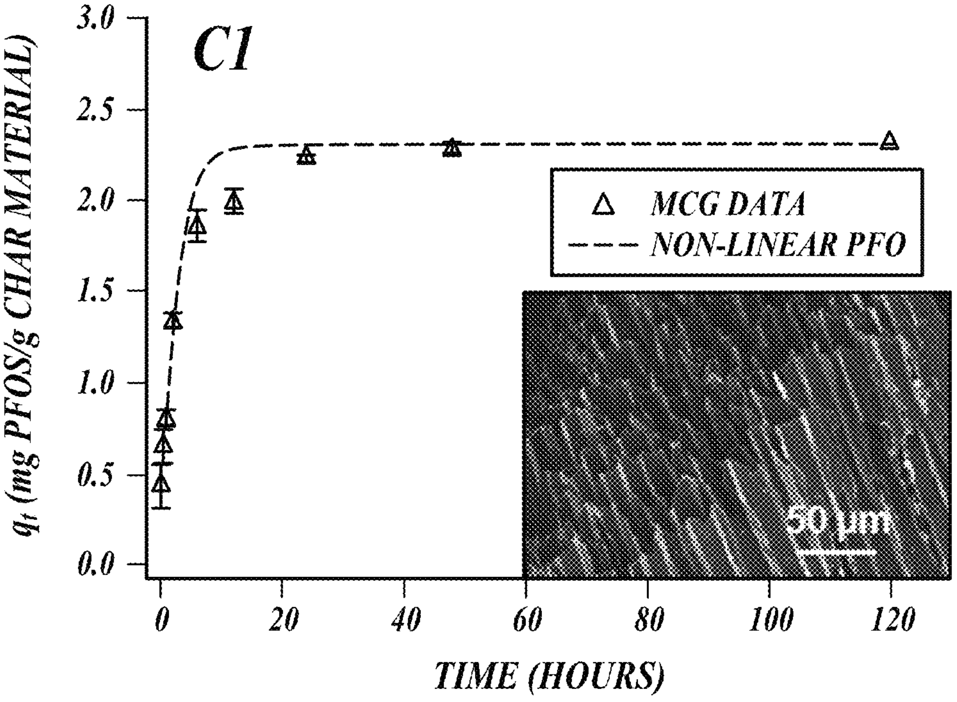
Figure 2F:
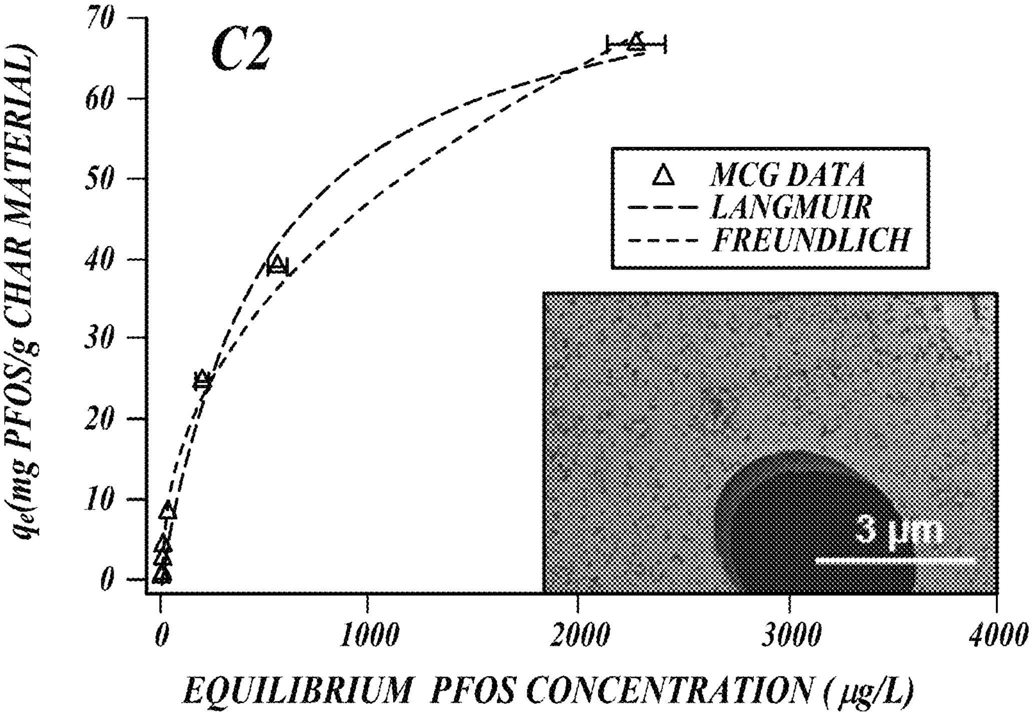

The Freundlich n"1 coefficient also indicate a degree of adsorption site non-linearity ($n^{-1}$=0.414, 0.228, 0.439 for the SCGKOH, F300, and MCG, respectively; FIG. 2G) which may be due to multilayer adsorption or variability in adsorption site binding affinity. Some multilayer adsorption is likely due to PFOS-PFOS hydrophobic interactions and hemimicelle formation either in solution or on the adsorbent surface, particularly at high PFOS concentrations. Additionally, differences in binding affinity may be due to decreased time required for PFOS diffusion within the larger pores and surface features (FIGS. 1 and 2E).

Interestingly, surface area alone was not a good predictor of adsorption capability for the three high surface area, high PFOS-adsorbing char materials. For example, MCG exhibited the lowest surface area but the greatest PFOS adsorption. Langmuir isotherm model parameter fitting for all three chars indicate MCG had the greatest PFOS adsorption capacity (79.5 mg PFOS/g char material) followed by F300 (55.7 mg/g) and then SCGKOH (43.4 mg/g). It is important to note that the inactivated SCG biochar possessing very low surface area also exhibit negligible PFOS adsorption, which suggests low surface area (i.e., 3-13 $m^2/g$) will decrease adsorption efficacy for chars. Zhi and Liu noted similar findings for PFOS adsorption onto various carbonaceous sorbents. Furthermore, they suggested that point of zero charge (PZC) and adsorbent basicity (evaluated with Boehm titration) were better indicators of adsorption capability, and materials with high PZC and basicity will exhibit greater PFOS adsorption. Zeta potential results (TABLE 4) indicate a similar hypothesis may apply to the chars examined in this study as the SCGKOH possesses the most negative zeta potential (−52.0 mV) followed by MCG (−26.2 mV) and F300 (−21.5 mV) under similar conditions. Evaluation of the PZC, surface acidity and basicity of these materials could provide a better understanding of the observed differences in PFOS adsorption capabilities.

Divalent Cations Improve and Hydrophobic EFOM Inhibits PFOS Adsorption

Figure 3:
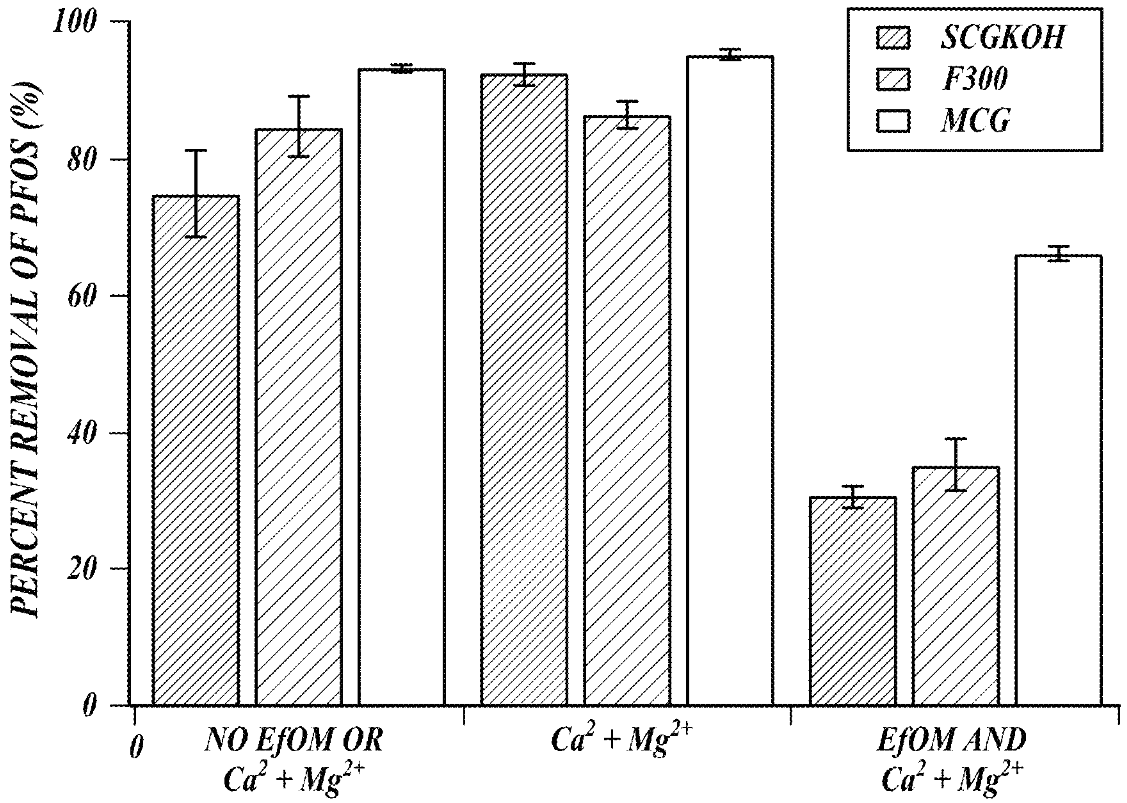
FIG. 3 illustrates the effect of 10 mg/L simulated wastewater treatment plant Effluent organic matter (EfOM), 26 mg/L $Ca^{2+}$, and 12 mg/L $Mg^{2+}$ ions on 340±23 μg/L PFOS removal by 100 mg/L SCGKOH, F300, and MCG, in accordance with an embodiment of the present disclosure.

Batch adsorption tests with divalent cations common in wastewater (26 mg/L $Ca^{2+}$, and 12 mg/L $Mg^{2+}$) showed an increase in PFOS removal capability for all three chars (FIG. 3). In the presence of divalent cations alone, SCGKOH exhibited a 24% increase in PFOS adsorption from that exhibited in the calcium and magnesium free matrix (i.e., from 87.8% to 92.4%) while F300 and MCG each exhibited a 2% increase in PFOS removal (i.e., F300 from 84.7% to 86.5%; MCG from 93.3% to 95.3%). The presence of $Ca^{2+}$ and $Mg^{2+}$ has been observed elsewhere to increase PFOS adsorption via ion bridging between the negatively charged char surface and the PFOS anionic headgroup. This mechanism is assumed to be principally responsible for the improved PFOS adsorption by SCGKOH as this adsorbent has the highest negative surface charge: −52.0 mV (SCGKOH) compared to −26.2 mV (MCG) and −21.5 mV (F300) under similar conditions (TABLE 4).

By contrast, batch adsorption tests where representative wastewater effluent organic matter (10 mg/L simulated EfOM) was included in addition to divalent cations showed a significant reduction in PFOS removal for all media (FIG. 3). The SCGKOH and F300 both experienced a 60% reduction in PFOS adsorption compared to the removal in the absence of EfOM and divalent cations (i.e., SCGKOH from 74.8% to 33.6%; F300 from 84.7% to 35.3%). MCG was least impacted with only 29% decrease in PFOS removal (i.e., from 93.3% to 66.2%). The greater MCG PFOS removal can be partially attributed to its faster uptake kinetics which allowed for the equilibrium adsorption capacity to be achieved at a faster rate. Even given this difference in uptake rates, it appears MCG is the most effective char in more complex water matrices. The decrease in PFOS removal in the presence of EfOM was assumed to be largely due to competition between hydrophobic EfOM and PFOS for binding sites on the char materials, and surface passivation by EfOM. Importantly, the positive effect of ion bridging by divalent cations is masked in the combined studies by the competitive adsorption of co-occurring EfOM. Further evaluation of adsorption behavior in matrices with increasing complexity could help elucidate these mechanisms.

Conclusions

SCG are a widely available waste product and an ideal carbonaceous feedstock for low-cost biochar adsorbents. Initial pyrolysis of SCG produced a biochar with high carbon content, low surface area, and poor PFOS removal capabilities. Activation of this material with 50 wt % KOH resulted in more than 300-fold increase in surface area, yielding a char with PFOS removal capabilities comparable to Calgon F300 activated carbon and a wood-based biochar material with demonstrated efficacy in PFAS adsorption. Our isotherm results indicate that low μg/L PFOS concentrations found in wastewater effluent would be treated to below the EPA PFOS HAL (i.e., 70 ng/L) using the SCGKOH. Introduction of simulated wastewater EfOM decreased PFOS removal on all three char materials. However, dissolved organic matter concentrations in drinking water are expected to be much lower; therefore, drinking water treatment using SCGKOH could be a viable application. Furthermore, the high PFOS removal exhibited by SCGKOH in the presence of divalent cations indicate this material will perform well in applications with moderate to high hardness but low organic content, such as drinking water treatment. The promising PFOS removal capabilities, abundant and low-cost waste-derived feedstock, and relatively low-resource production process make this material an advantageous option for water treatment in rural or resource-constrained areas. The size, structural integrity, and increased surface functional group heterogeneity of the SCGKOH can also facilitate further modification to improve adsorption capabilities for PFOS or other contaminants during water treatment.

Example 2: Filtration of Simulated Storm Water

Preparation of SCG Biochar

SCG biochar was produced as in Example 1.

Stormwater Mixture

The stormwater mixture used in the column and batch sorption were prepared with a simulated stormwater mixture, natural organic matter, and the trace contaminants of interest. The simulated stormwater mixture included the following constituents and constituent concentrations (TABLE 9).

TABLE 9

| Simulated stormwater matrix representing realistic anion and cation concentrations in stormwater. | |
|---|---|
| Constituent | Concentration (mM) |
| $Ca^{2+}$ | 0.75 |
| $Mg^{2+}$ | 0.075 |
| $Na^{+}$ | 1.75 |
| $NH_4^{+}$ | 0.072 |
| $SO_4^{2-}$ | 0.33 |
| $HCO_3^{-}$ | 1.00 |
| $Cl^{-}$ | 1.70 |
| $NO_3^{-}$ | 0.072 |
| $H_2PO_4^{-}$ | 0.016 |

The stock solutions of the simulated stormwater mixture were prepared by separating the anions and cations to prevent precipitation. Magnesium chloride hexahydrate ($MgCl_2 \cdot 6H_2O$), calcium chloride dihydrate ($CaCl_2 \cdot 2H_2O$) and ammonium chloride ($NH_4Cl$) were used as representative cations in the simulated stormwater matrix. Sodium sulfate ($Na_2SO_4$), sodium bicarbonate ($NaHCO_3$), sodium nitrate ($NaNO_3$) and sodium phosphate monobasic monohydrate ($NaH_2PO_4 \cdot H_2O$) served as representative anions in the simulated stormwater mixture.

Humic acid from Sigma Aldrich was used to represent NOM in the stormwater at a concentration of 10 mg-C/L. Humic acid was chosen instead of the Suwannee River NOM (SRNOM) standard as large volume of NOM was needed to complete all tests and SRNOM was financially restrictive. Humic acid provides an acceptable NOM proxy as the dominant organic matter expected in biochar applications is terrestrially derived organic carbon. Humic acid concentrations were measured using a Sievers TOC analyzer.

The trace contaminants used were ATR, CAF, DIU, FIP, and PCP and the concentrations varied depending on the test. The contaminants were chosen to represent a wide range of hydrophobicity (TABLE 10) among organic compounds commonly found in urban stormwater to determine if the SCGKOH has selective adsorption affinities for more hydrophobic compounds.

TABLE 10

Properties of trace organic contaminants used in batch sorption and column analyses including typical stormwater concentrations (TSC) (Masoner et al. 2019) and reference dose (RfD) (EPA 2020).

| Compound | Structure | MW (g/mol) | Purity | TSC (ng/L) | RfD (mg/kg/day) | Log $K_{ow}$ |
|---|---|---|---|---|---|---|
| Caffeine, CAF (wastewater pollution indicator) | 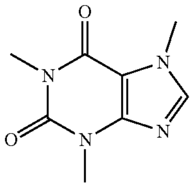 | 194.19 | N/A | 1,000 | 0.0025 | −0.07 |
| Atrazine, ATR (herbicide) | 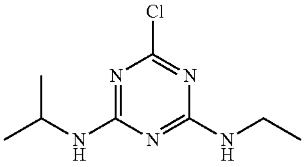 | 215.68 | >97.0% | 30 | 0.002 | 2.61 |
| Diuron, DIU (herbicide) | 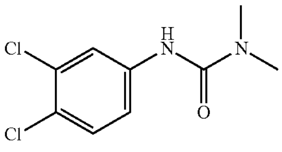 | 233.09 | >98.0% | 50 | 0.003 | 2.68 |
| Fipronil, FIP (insecticide | 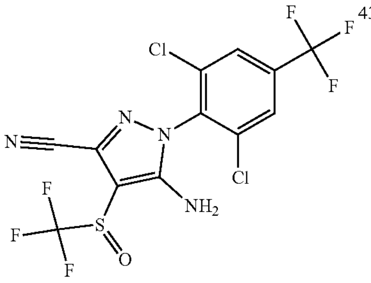 | 437.15 | 97.5% | 15 | 0.0002 | 4.00 |

TABLE 10-continued

Properties of trace organic contaminants used in batch sorption and column analyses including typical stormwater concentrations (TSC) (Masoner et al. 2019) and reference dose (RfD) (EPA 2020).

| Compound | Structure | MW (g/mol) | Purity | TSC (ng/L) | RfD (mg/ kg/day) | Log $K_{ow}$ |
|---|---|---|---|---|---|---|
| Pentachloro-phenol, PCP (herbicide) | 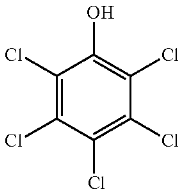 [SMILES: Oc1c(Cl)c(Cl)c(Cl)c(Cl)c1Cl] | 266.33 | 97.0% | 400 | 0.005 | 5.12 |

The organic contaminant concentrations were measured using LC-MS analytical chemistry technique while using diuron-d6 and pentachlorophenol-13C6 internal standards to account for sample loss and instrument variability.

Batch Sorption Tests

The adsorption capacities of SCG 400 and SCGKOH were evaluated through single and multipollutant studies as well as through isotherm batch sorption tests. Additionally, the trace organic compound adsorption rates on SCG 400 and SCGKOH were evaluated through batch kinetic tests. Each batch sorption test was run in triplicates and with control samples (i.e., no adsorbent) and dosed with 1 g/L of biochar. After each batch sorption test was completed, samples were filtered with a 0.22 μm filter and mixed with diuron-d6 and pentachlorophenol-13C6 internal standards in LC-MS vials for LC-MS analysis. This approach was used for all batch sorption tests to quantify trace organic contaminant concentrations. No syringe filtration was performed for the column studies.

Adsorption Capacity

The adsorption capacity batch sorption tests (TABLE 11) were used to evaluate the impact of trace contaminant adsorption onto the biochar from each individual element of the column studies. The adsorption capacity tests were dosed with contaminants at 50 μg/L. All adsorption capacity tests were mixed with 1 g/L of biochar for 5 days. For certain single and mixed pollutant studies, a Milli-Q water was used in place of the simulated stormwater matrix. The adsorption of NOM by SCG 400 and SCGKOH in test #4 was evaluated using a Sievers TOC analyzer.

TABLE 11

Adsorption capacity batch sorption test parameters including presence of NOM and a simulated stormwater matrix (SSM).

| Batch Sorption Test | Biochar Type | Contam-inant System | Contaminant Concentration | NOM | SSM |
|---|---|---|---|---|---|
| 1 | SCG 400 | Individual | 50 μg/L | N/A | No |
| 1 | SCGKOH | Individual | | N/A | No |
| 2 | SCG 400 | Mixed | | N/A | No |
| 2 | SCGKOH | Mixed | | N/A | No |
| 3 | SCG 400 | Mixed | | N/A | Yes |
| 3 | SCGKOH | Mixed | | N/A | Yes |
| 4 | SCG 400 | Mixed | N/A | 10 mg-C/L | Yes |
| 4 | SCGKOH | Mixed | N/A | | Yes |
| 5 | SCG 400 | Mixed | 50 μg/L | | No |
| 5 | SCGKOH | Mixed | | | No |
| 6 | SCG 400 | Mixed | | | Yes |
| 6 | SCGKOH | Mixed | | | Yes |

Adsorption Isotherms

The isotherm tests were used to evaluate the maximum adsorption capacity of SCGKOH biochar. In the isotherm tests, the contaminants were dosed as listed in TABLE 12. All isotherm tests were mixed with 1 g/L of SCGKOH biochar for 5 days. For isotherm study, the SSM also contained a humic acid concentration of 10 mg-C/L.

TABLE 12

Isotherm batch sorption tests parameters with varying contaminant concentrations in the presence of NOM and a SSM.

| Batch Sorption Test | Biochar Type | Contam-inant System | Contaminant Concentration | NOM | SSM |
|---|---|---|---|---|---|
| 7 | SCGKOH | Mixed | 25 μg/L | 10 mg-C/L | Yes |
| 7 | | | 75 μg/L | | |
| 7 | | | 100 μg/L | | |
| 8 | | | 250 μg/L | | |
| 8 | | | 750 μg/L | | |
| 8 | | | 1,000 μg/L | | |
| 9 | | | 2,500 μg/L | | |
| 9 | | | 7,500 μg/L | | |
| 9 | | | 10,000 μg/L | | |

Adsorption Kinetics

The batch sorption kinetics tests were used to evaluate the rate of adsorption of the five trace contaminants (CAF, ATZ, DIU, FIP, and PCP). The kinetics tests were dosed with 50 μg/L of each contaminant and mixed with 1 g/L of SCGKOH biochar. Sampling was performed after for 1 minute, 5 minutes, 10 minutes, 30 minutes, 1 hour, 12 hours, 24 hours, and 5 days of reaction. The SSM with 10 mg-C/L humic acid was used for all kinetics studies.

Column Building

Bench scale column tests were conducted to compare the contaminant removal performance of biochar as a function of weight percentage (wt %). Sand only columns were prepared as controls of 0.5 wt % and 3 wt % biochar-amended test columns. Triplicates of all columns were used for statistical analysis of all the column data. The columns were constructed using SCH 40 (1.125" inner diameter) PVC pipe cut to 6" and pipe fittings from McMaster Carr. The pipe fittings were sealed and connected to the PVC pipe with Oatey Medium Black ABS Cement. Fine mesh was glued inside the pipe fitting to prevent sand from washing out of the columns. Each column was packed by filling the lower pipe fitting with pea gravel, then adding sand or the sand and biochar mixtures (at 0.5 wt % and 3 wt %) until the PVC pipe was full, and then adding the upper pipe fitting filled with pea gravel. The columns were connected to an outlet drainage pipe. The pump was calibrated to find the pumping speed for 1 mL/min to mimic realistic infiltration rates. The columns were then flushed with deionized water for 24 hours at the lowest pump setting and any leaks were sealed with Oatey Medium Black ABS Cement.

Tracer Test

Once the columns were built and flushed with deionized water, a tracer test was performed using a 500 mg/L sodium fluoride solution at a pumping rate of 1 mL/min. The fluoride mixture was pumped through the columns for 20 minutes and then sampled every 4 minutes until the tracer breakthrough peak was detected. The sand only and 0.5 wt % columns had pore volumes of 96 minutes, and the 3.0 wt % columns had a pore volume of 108 minutes at the porosities corresponding to each column and the designated flow rate. The aqueous fluoride concentrations were measured with a Mettler Toledo perfectION™ Combination Fluoride Electrode.

Results and Discussion

This section includes data on biochar characterization, batch sorption tests, and bench scale column studies.

Biochar Characterization

Proximate carbon analyses of the SCG feedstock, SCG 400, and SCGKOH showed fixed carbon percentages of 17%, 71.1%, and 84.8% respectively. Upon pyrolysis and then activation with KOH, the fixed carbon content increased by 318% and then by 19% which indicates an increasing degree of aromaticity and hydrophobicity in the biochar. It was hypothesized that the increased hydrophobicity would contribute to a greater extent of trace organic removal in the batch sorption and column tests. Additionally, The BET surface areas of SCG 400 and SCGKOH were measured as 2.66 $m^2/g$ and 852.11 $m^2/g$ respectively. Upon activation with KOH, the specific surface area increased 31,932% The high surface area of the activated biochar also indicates a high degree of porosity within the media, which will result in an abundance of sorption sites and pathways for contaminant diffusion. Finally, the surface zeta potential analysis reported zeta potentials of −37.8 mV and −52.0 mV for SCG 400 and SCGKOH respectively. While both types of biochar were found to have negative surface charges, SCGKOH measured more negative with the zeta potential increasing by 37.6% after activation with KOH potentially due to the creation of more acid-based surface functional groups upon activation. This negative surface charge suggests SCG 400 and SCGKOH will have high adsorption affinities for positively charged ions.

Batch Sorption Results

Ten batch sorption tests (including kinetics tests) were completed to test different aspects of the SCG biochar's adsorption capabilities by varying contaminant, contaminant concentration, presence of natural organic matter or simulated stormwater matrix, and mixing time. Batch test results comparing adsorption of organics were plotted as normalized organic contaminant removal (i.e., final concentration (μg/L) divided by initial concentration (μg/L) as a function of the trace organic compound or time.

Adsorption Capacity

The effects of individual ("Individual Cont") and mixed contaminant (i.e., "Mixed Cont") matrices, natural organic matter, and a simulated stormwater matrix ("SSM"s) on trace organic compound adsorption by the SCG 400 and SCGKOH biochar were first evaluated through batch sorption tests. The trace organics plotted in FIGS. 10A, 10B, 11, 12A, and 12B are in order of increasing log $K_{ow}$ values.

SCG 400 adsorbed low amounts of CAF, ATR, and PCP (15-25%) and higher amounts of DIU and FIP (60-90%). SCGKOH removed nearly all contaminants in the individual contaminant matrix. When compared to the individual contaminant matrix, the SCG 400 biochar removed fewer contaminants when exposed to a mixed contaminant matrix except for the more hydrophobic compounds (FIP and PCP). This trend was expected as the presence of multiple compounds compete for binding sites on the biochar surface. The high variances in FIP and PCP removal are likely due to errors in the data acquisition. When the SSM was added to a mixed contaminant matrix, SCG 400 removed more contaminants than the batch sorption tests with only a mixed contaminant matrix (apart from FIP) likely due to ion bridging effects from cations in the SSM (Reddy 2014). Overall data tends for SCG 400 showed increased trace organic removal with increased compound hydrophobicity (i.e., log $K_{ow}$) as hypothesized. PCP was the only contaminant to vary from the trend, but also exhibited the highest standard deviation. This hydrophobic trend likely persisted due to the low porosity and surface area of SCG 400. While there was low or varied contaminant removal efficiencies by the SCG 400 biochar, the SCGKOH biochar exhibited almost complete removal of all trace organics with no preferential adsorption for more hydrophobic compounds. SCGKOH likely exhibited higher removal capabilities compared to SCG 400 due to an increased surface area, higher microporosity, and stronger surface charge.

Next, the adsorption of humic acid ("NOM") by SCG 400 and SCGKOH (FIG. 11) as well as the effects of NOM on SCG 400 and SCGKOH adsorption of a mixed contaminant matrix in the presence and absence of SSM (FIGS. 12A and 12B) were evaluated through batch tests.

SCGKOH exhibited higher adsorption of natural organic matter which may be attributed to the higher porosity and surface area of the activated biochar. However, high statistical error of the data for SCGKOH adsorption of NOM may indicate further analysis is needed.

Figure 10A:
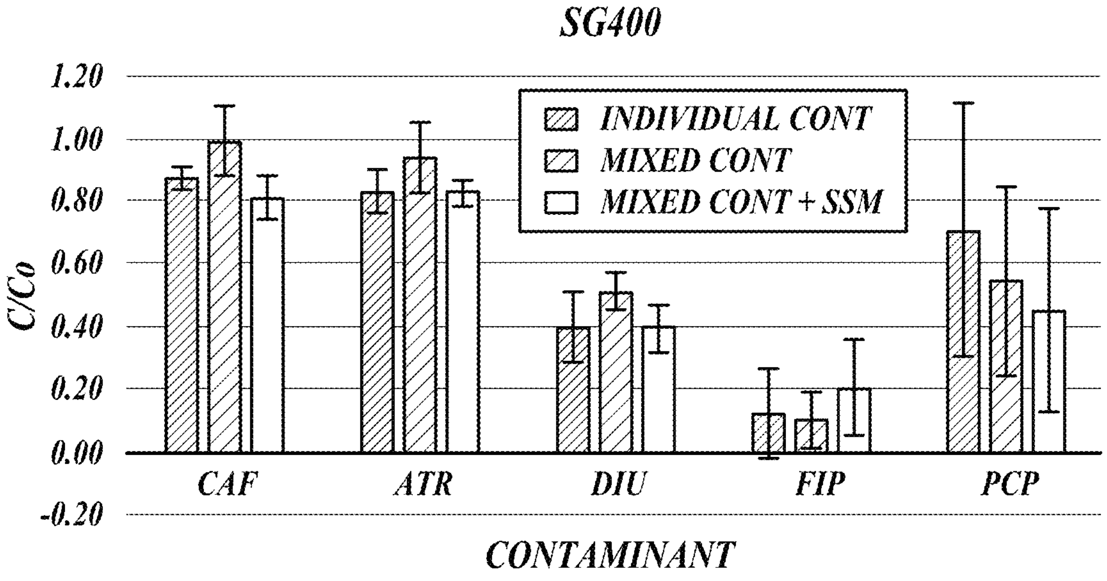
FIGS. 10A and 10B illustrate 5-day batch adsorption results of (10A) 1 g/L SCG400 or (10B), where 1 g/L SCGKOH and 50 μg/L of individual contaminant matrices, 50 μg/L (each) mixed contaminant matrix, and a 50 μg/L (each) mixed contaminant matrix in synthetic stormwater matrix (SSM), in accordance with an embodiment of the present disclosure.
Figure 10B:
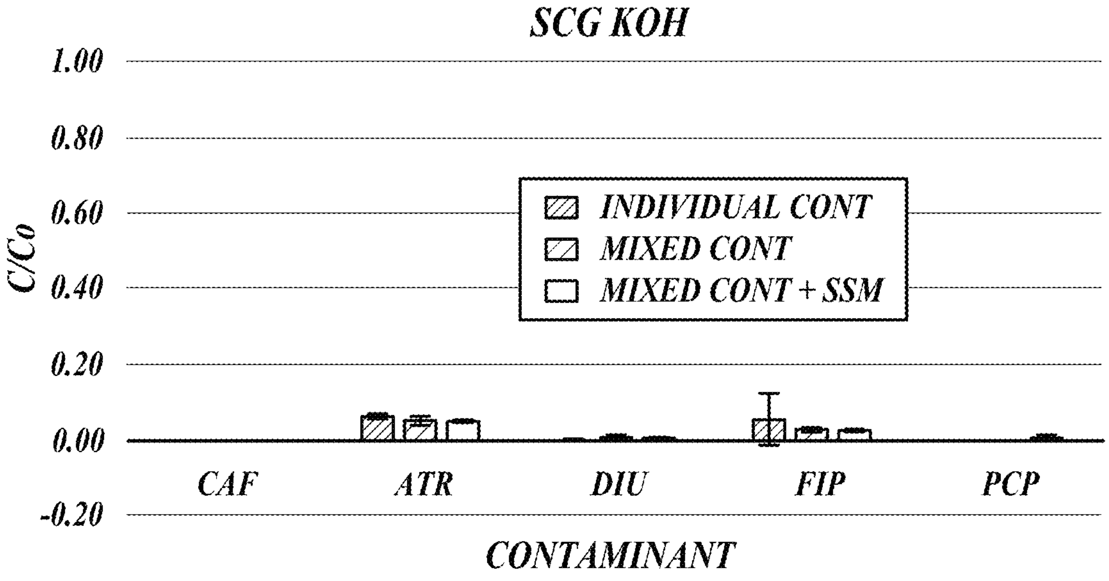
Figure 11:
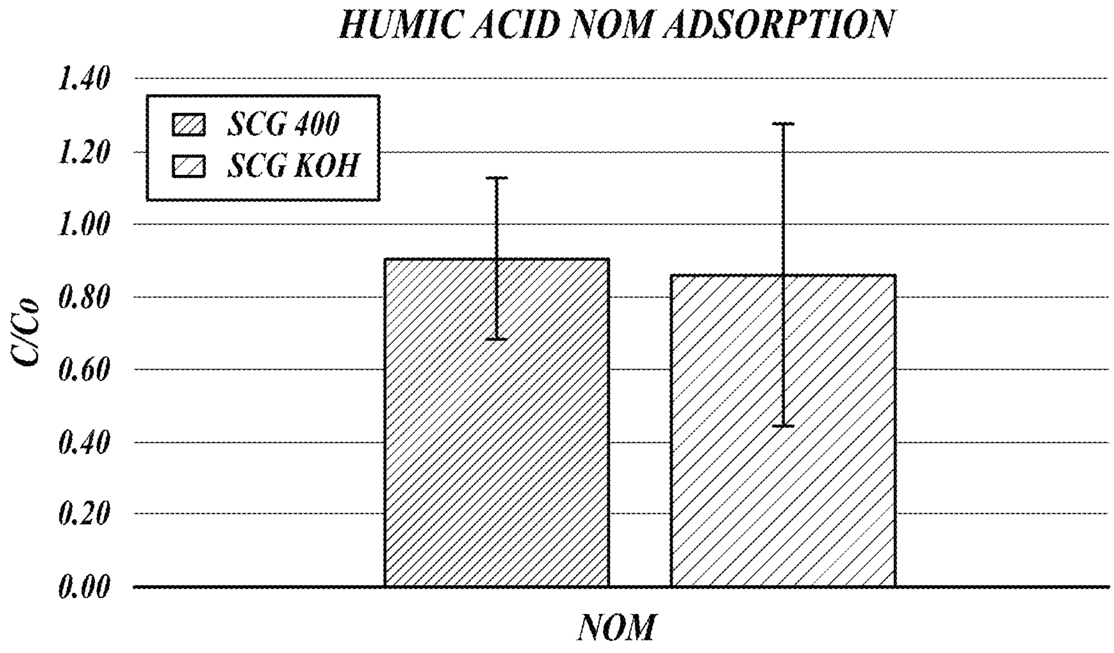
FIG. 11 illustrates 5-day batch adsorption results of 10 mg-C/L humic acid natural organic matter (NOM) by 1 g/L SCG 400 and 1 g/L SCGKOH, in accordance with an embodiment of the present disclosure.
Figure 12A:
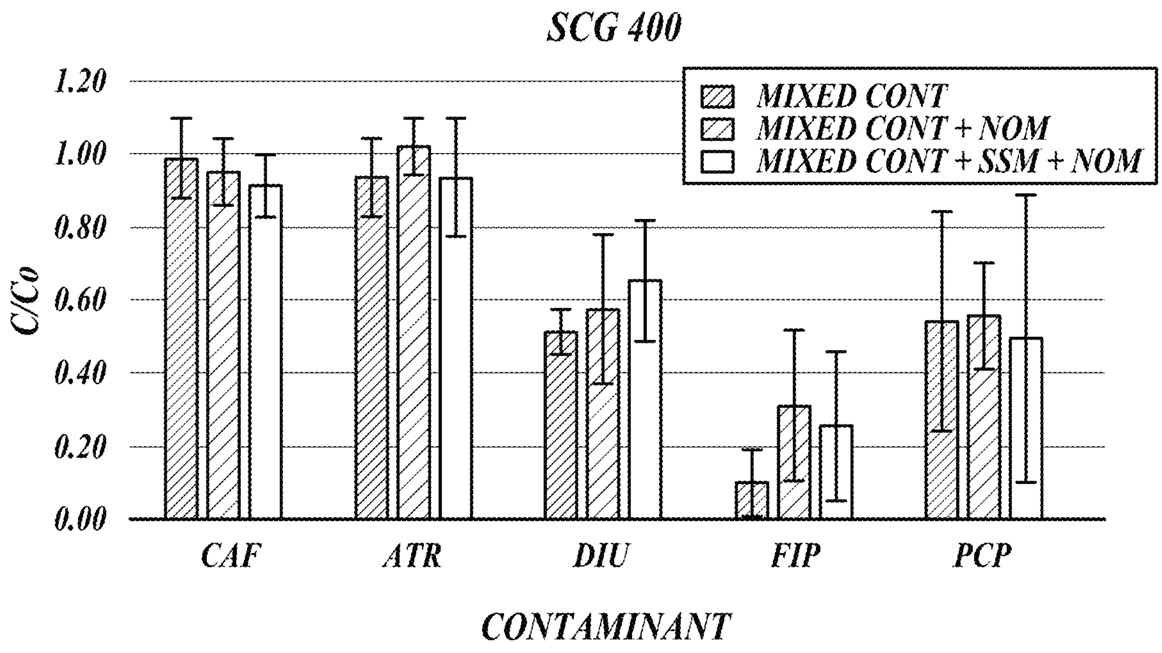
FIGS. 12A and 12B illustrate 5-day batch adsorption results of (12A) 1 g/L SCG 400 or (12B) 1 g/L SCGKOH and 50 μg/L (each) in a mixed contaminant matrix, in the presence of 10 mg-C/L NOM, and in the presence of 10 mg-C/L NOM and the SSM, in accordance with an embodiment of the present disclosure.
Figure 12B:
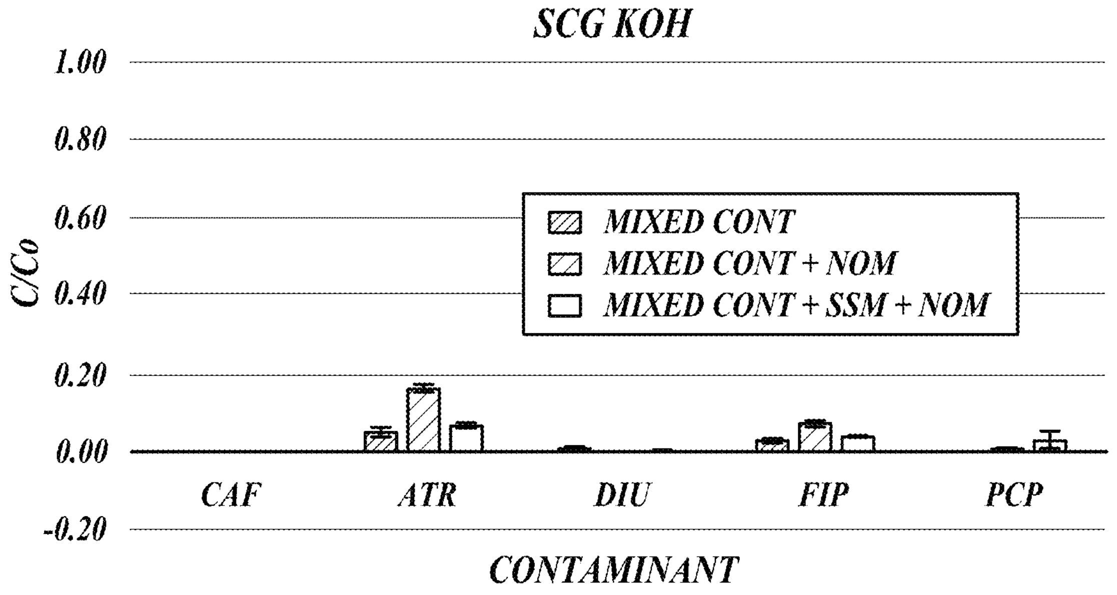

The SCG 400 biochar removed fewer contaminants in the mixed contaminant matrix containing NOM (exception: CAF. This trend was expected as hydrophobic compounds compete with hydrophobic NOM for binding sites on the biochar surface. As with the previous batch sorption tests, the high variances in FIP and PCP removal are likely due to errors in the data acquisition. Additionally, when the representative anions and cations in the SSM was added to the mixed contaminant matrix containing NOM, SCG 400 removed more contaminants in the absence of SSM (exception: DIU) likely due to cations in the SSM bridging the negative surface charge of the biochar and negative organic contaminants. Overall data tends for SCG 400 in these batch sorption tests showed increased removal with increased hydrophobicity as hypothesized. PCP was the only contaminant to vary from the trend, but also exhibited the highest error. This finding was similar to the previous observation in FIG. 10A comparing trace organic removal in individual and mixed contaminant systems in Milli-Q water. This hydrophobic trend likely persisted due to the low porosity and surface area of SCG 400. SCGKOH exhibited almost complete removal of all trace organics regardless of SSM or NOM addition with no preferential adsorption for more hydrophobic compounds. SCGKOH removed more contaminants than SCG 400 likely due to increases surface area and porosity in the media upon chemical activation.

Isotherm Study

Figure 13:
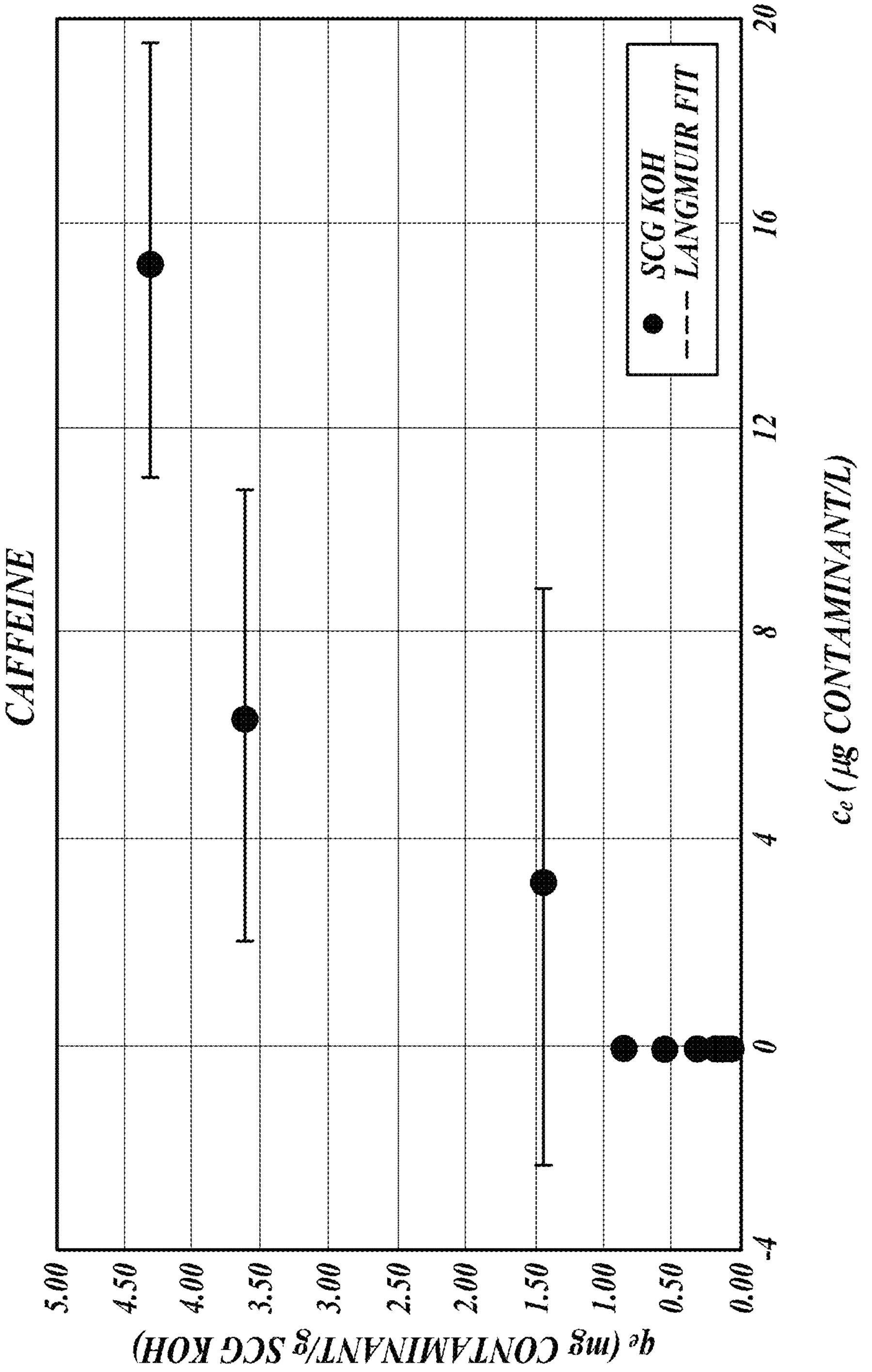
FIG. 13 illustrates batch adsorption capacity and Langmuir isotherm fit of 1 g/L SCGKOH and varying initial concentrations of caffeine in a SSM with 10 mg-C/L, in accordance with an embodiment of the present disclosure.

Isotherm batch adsorption test results were plotted as mass of contaminant adsorbed per mass of adsorbent ($q_e$, mg/g) as a function of final aqueous phase equilibrium contaminant concentration ($c_e$, μg/L). Approximately 15 mg of activated biochar was mixed for 5 days with contaminant concentrations ranging from 25 μg/L to 10,000 μg/L in 15 mL of SSM and in the presence of NOM. Contaminant ranges were chosen at several orders of magnitude higher than found in actual stormwater conditions to force the adsorption to reach equilibrium to determine the maximum adsorption capacity. The results were fit to Langmuir isotherms. The Langmuir fit for caffeine is reported in FIG. 13, while the fits for the remaining contaminants are reported in illustrated in FIGS. 20A-20D.

Langmuir isotherm fittings resulted in poor correlation with the caffeine equilibrium adsorption data because the SCGKOH removed nearly all contaminants even at the highest examined initial concentrations. A similar finding was observed for the rest of the trace organics. The poor fit for Langmuir and Freundlich isotherms suggests that the maximum adsorption capacity for the SCGKOH has yet to be achieved given the range of initial contaminant concentrations (i.e., highest concentration: 10 mg/L). However, as the highest contaminant dose used in the isotherm batch sorption tests far exceeded the typical stormwater concentrations for each contaminant ((study: 10,000 μg/L versus real stormwater levels: 1000 ng/L for caffeine), it can be inferred that SCGKOH will have a high removal capacity for trace organic contaminants.

Kinetics

Figure 14A:
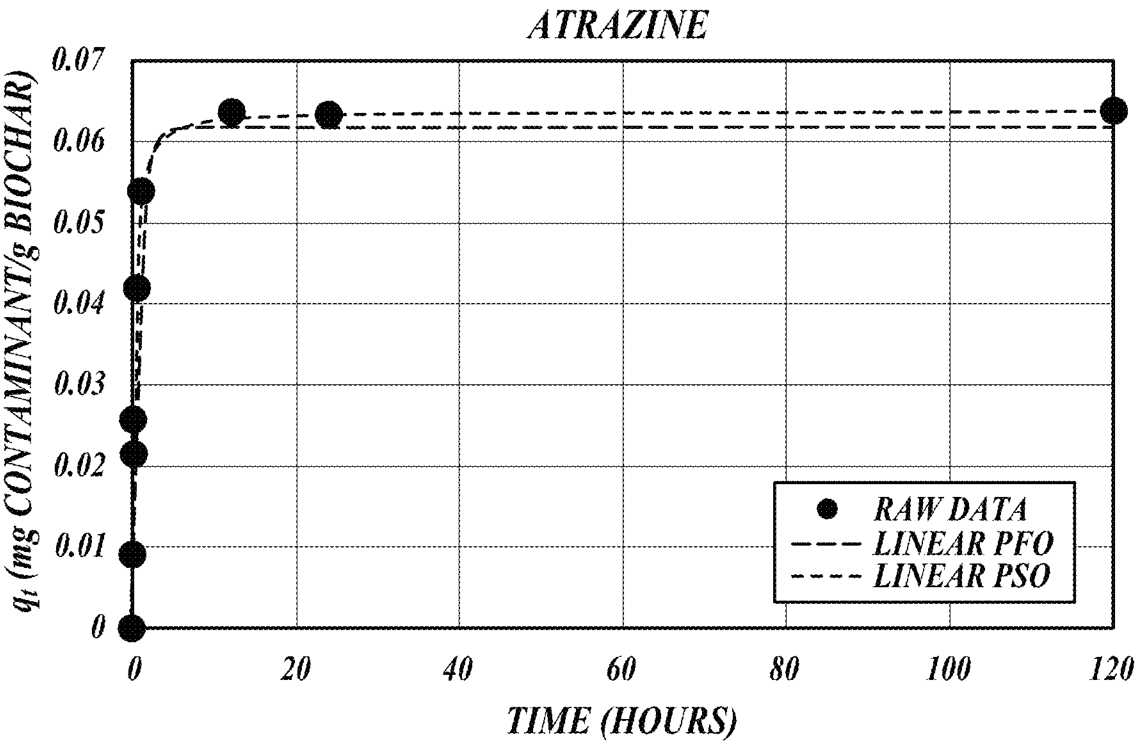
FIGS. 14A and 14B illustrate batch kinetics sorption results of 1 g/L SCGKOH, 50 μg/L of 14A atrazine and 14B caffeine in the SSM in the presence of 10-C mg/L NOM, in accordance with embodiments of the present disclosure, where fits were performed using linear pseudo first order and pseudo second order models.
Figure 14B:
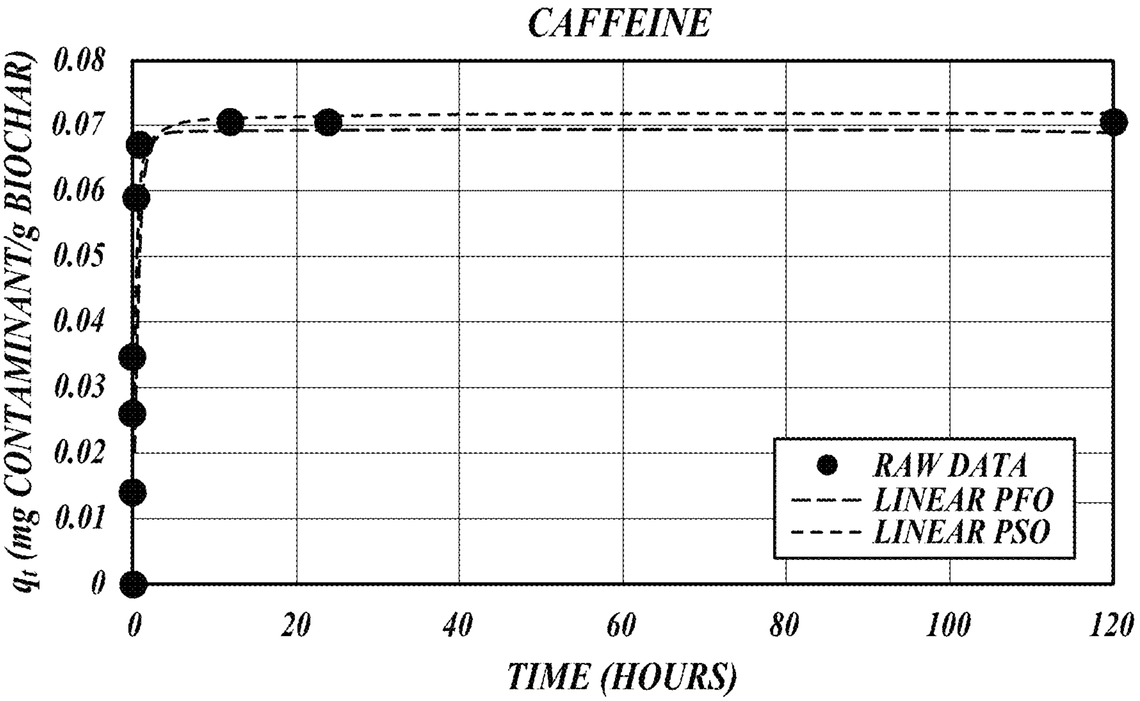

The mass of adsorbed trace organic per mass of SCGKOH was plotted as a function of time t to understand the rate of contaminant removal. Kinetic fittings were performed using both the linear pseudo first order ("Linear PFO") and linear pseudo second order ("Linear PSO") models. The fittings and sorption kinetics results for atrazine and caffeine are reported in FIGS. 14A and 14B.

Figure 21A:
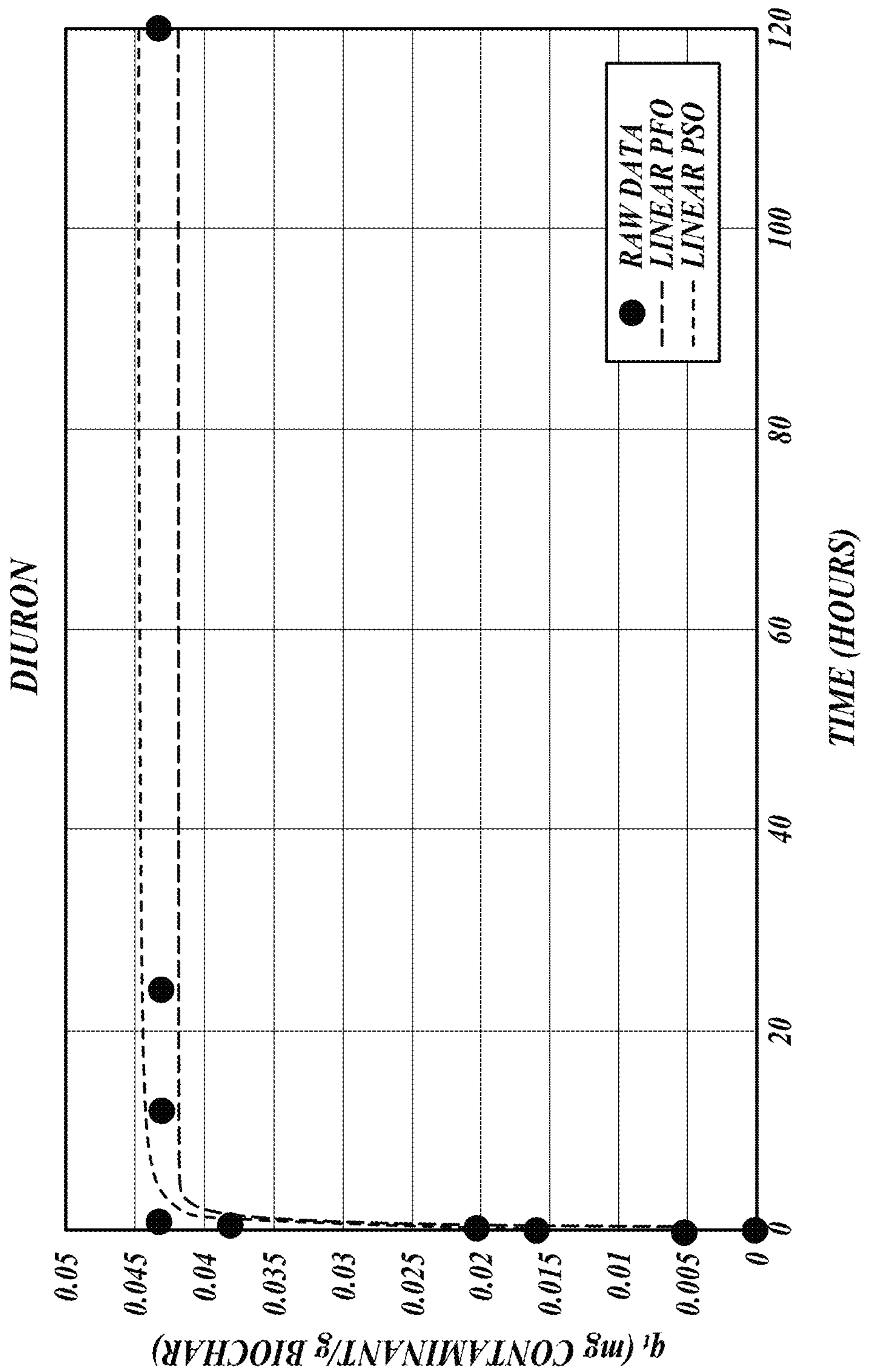
FIGS. 21A-21C illustrate batch kinetics sorption results of 1 g/L SCGKOH 50 μg/L of (21A) diuron, (21B) fipronil and (21C) pentachlorophenol in the SSM in the presence of 10 mg-C/L NOM, in accordance with an embodiment of the present disclosure, where fits were performed using linear pseudo first order and pseudo second order models.
Figure 21B:
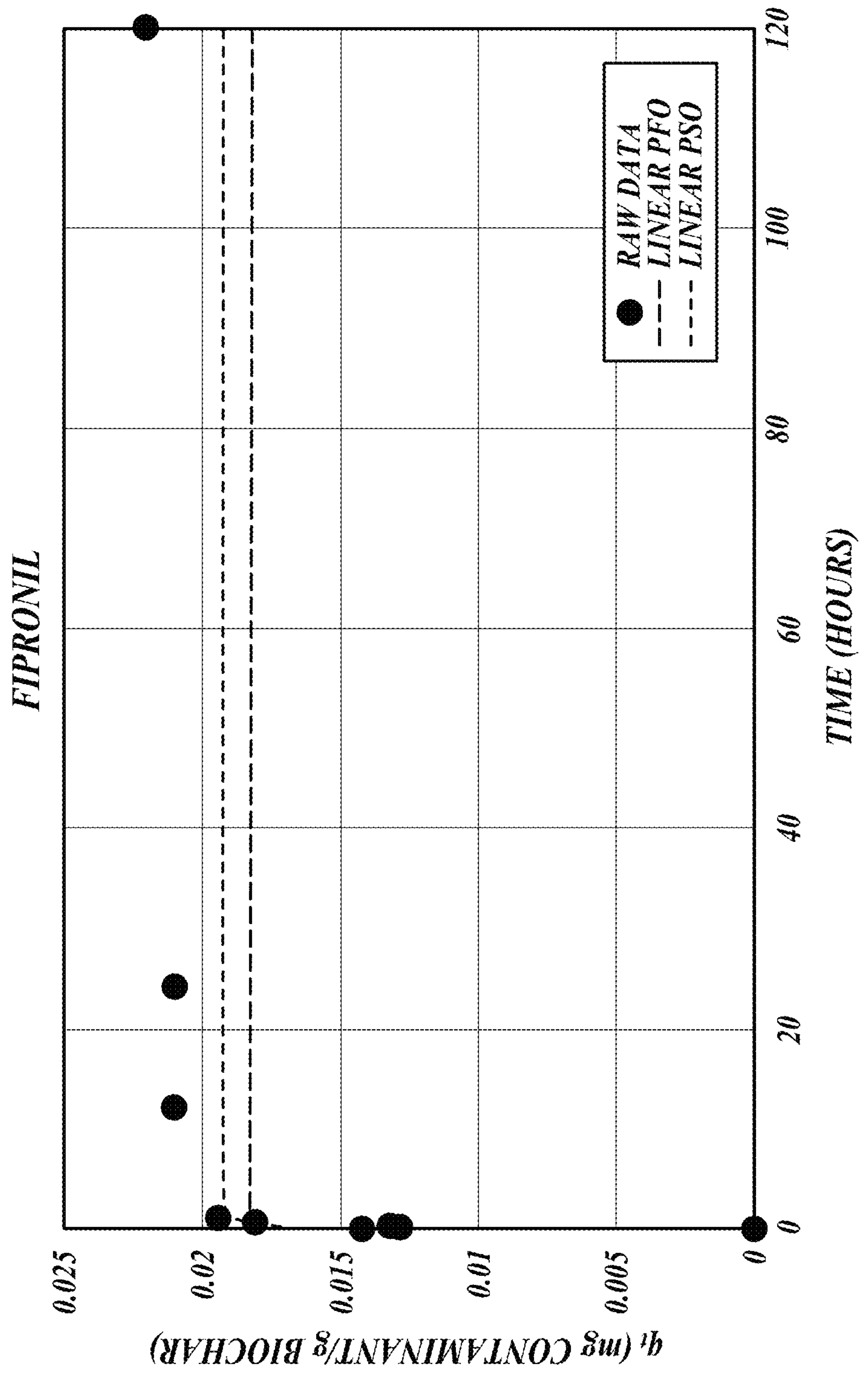
Figure 21C:
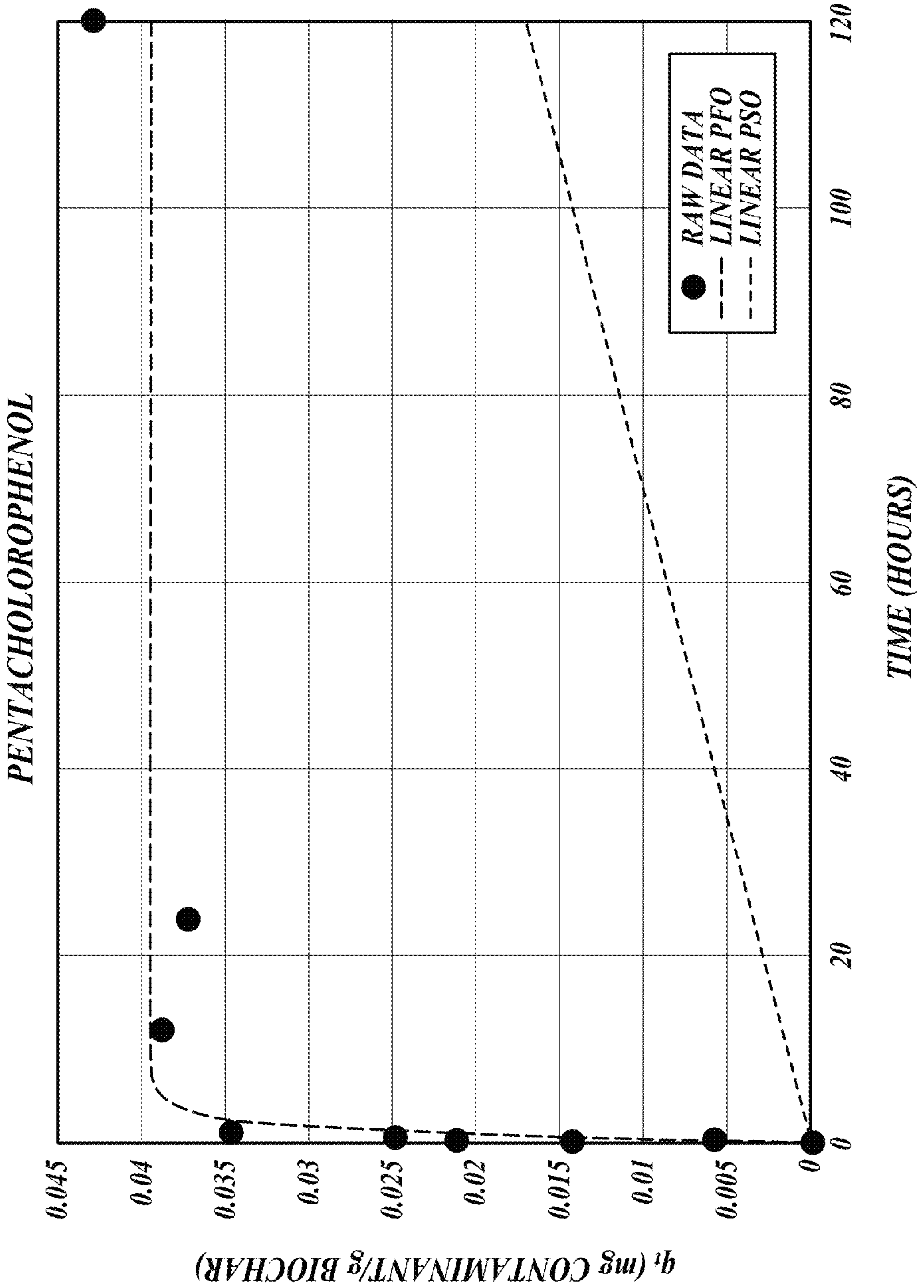

Raw data from the kinetic batch sorption tests showed equilibrium adsorption times between 1-12 hours. Additionally, the raw data fit best to a linear PSO fit except for PCP (FIG. 21) which implies the adsorption occurred under conditions relevant to PSO. Once fit with a linear PSO curve, most contaminants were adsorbed by SCGKOH around 4 hours. The rate constants, $k_1$ and $k_2$, from the linear PFO and linear PSO fittings respectively (TABLE 13)

TABLE 13

Rate constants in hours for the linear pseudo first order ($k_1$) and linear pseudo second order ($k_2$) fittings.

| Compound | $k_1$ (h) | $k_2$ (h) |
|---|---|---|
| CAF | 3.01 | 12.1 |
| ATZ | 0.24 | 6.09 |
| DIU | 4.22 | 12.4 |
| FIP | 2.44 | 3.68 |
| PCP | 1.08 | 1.11 |

As the linear PSO fitting matched the raw data best, the $k_2$ values indicate PCP had the fastest reaction time while DIU reacted the slowest. The rate constants are higher for the less hydrophobic compounds (CAF, ATZ, and DIU) showing faster adsorption of the more hydrophobic compounds by SCGKOH.

Figure 15:
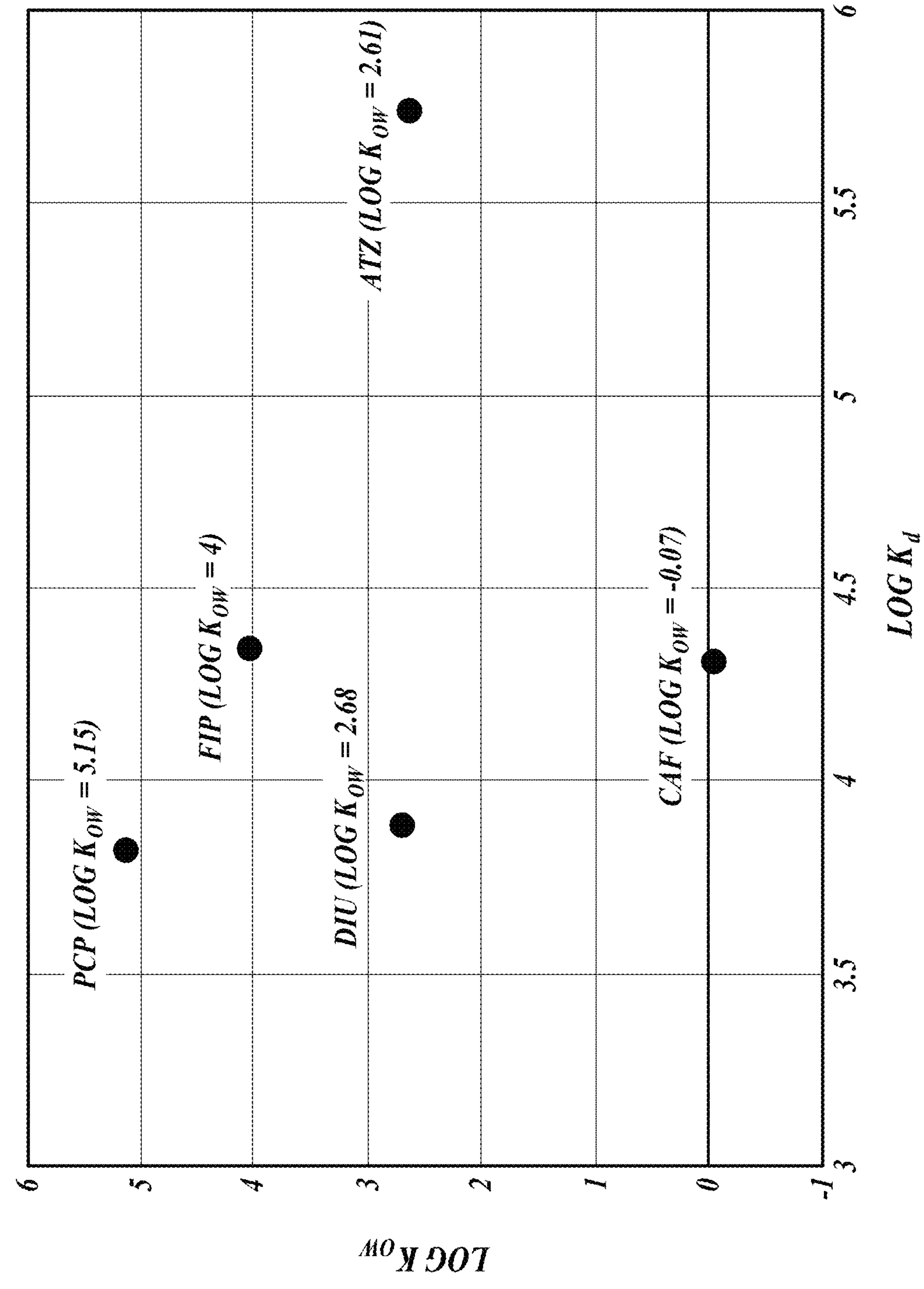
FIG. 15 illustrates log $K_{ow}$ versus the calculated log $K_d$ for SCG biochars for contaminants, atrazine (ATR), caffeine (CAF), diuron (DIU), fipronil (FIP), and pentachlorophenol (PCP), in accordance with an embodiment of the present disclosure.
Figure 16:
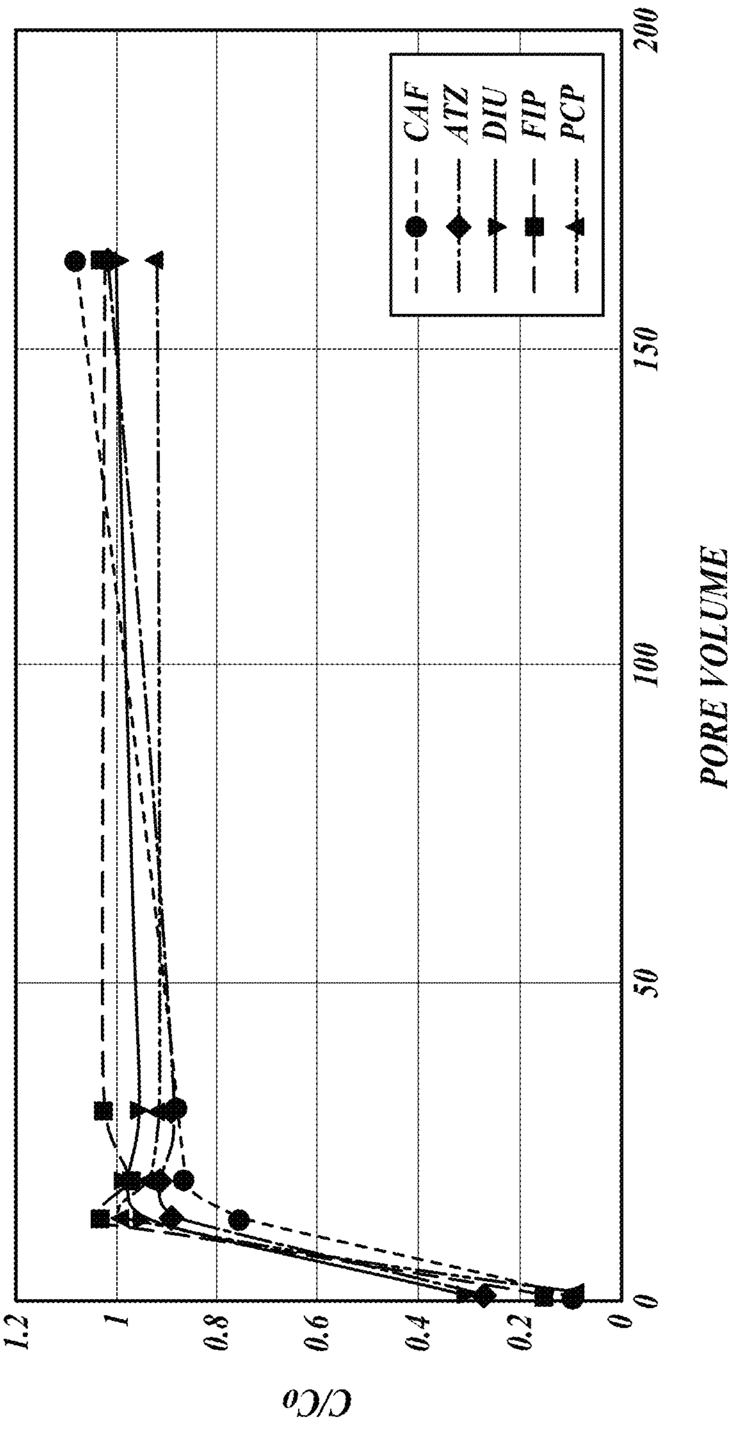
FIG. 16 illustrates sand-only column breakthrough curves plotting normalized contaminant concentration as a function of pore volume, where the feed solution contained 50 μg/L of each contaminant, 10 mg-C/L NOM, and a SSM.
Figure 17:
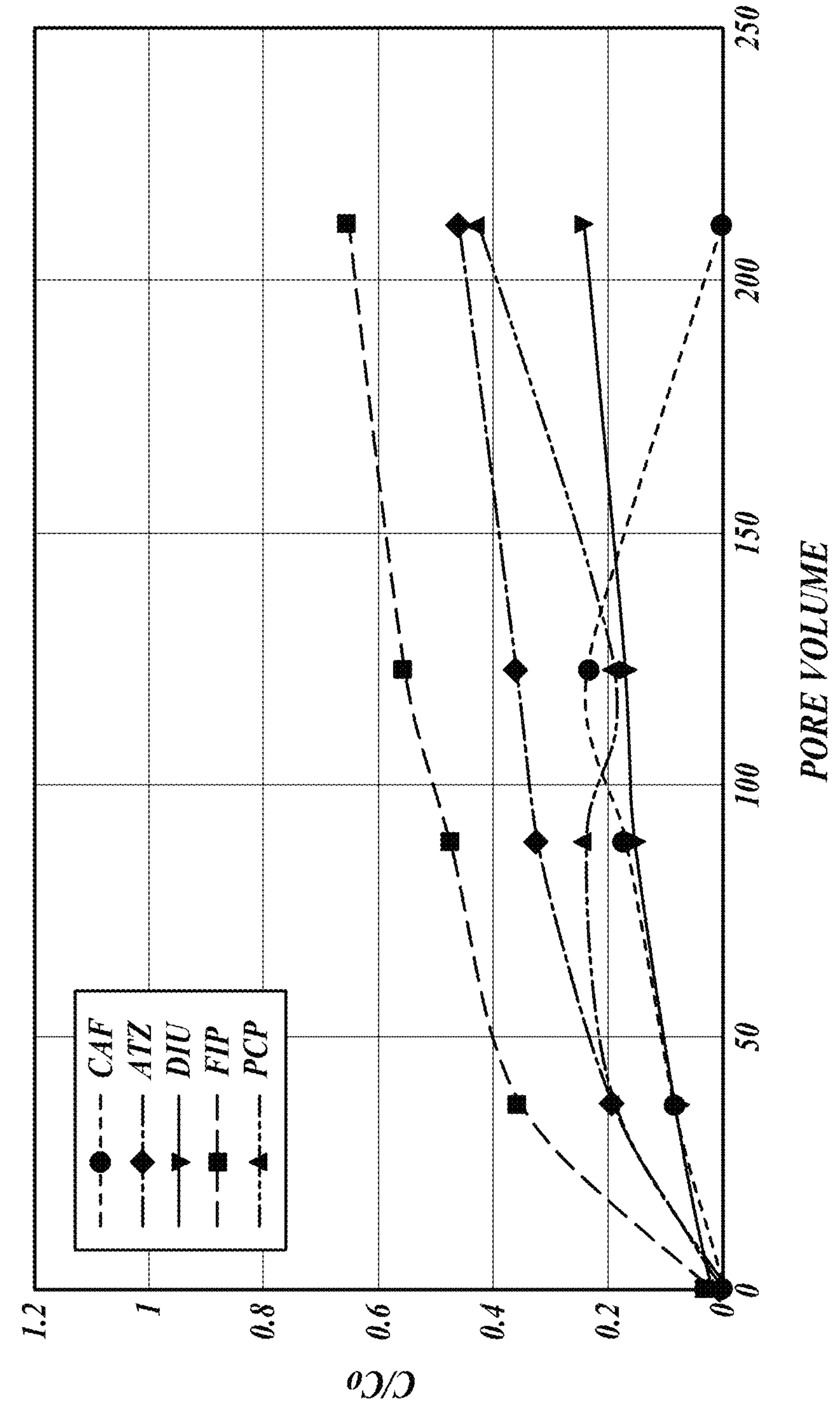
FIG. 17 illustrates 0.5 wt % column breakthrough curves plotting normalized contaminant concentration as a function of pore volume, in accordance with an embodiment of the present disclosure, where the feed solution contained 50 μg/L of each contaminant, 10 mg-C/L NOM, and a SSM.
Figure 18:
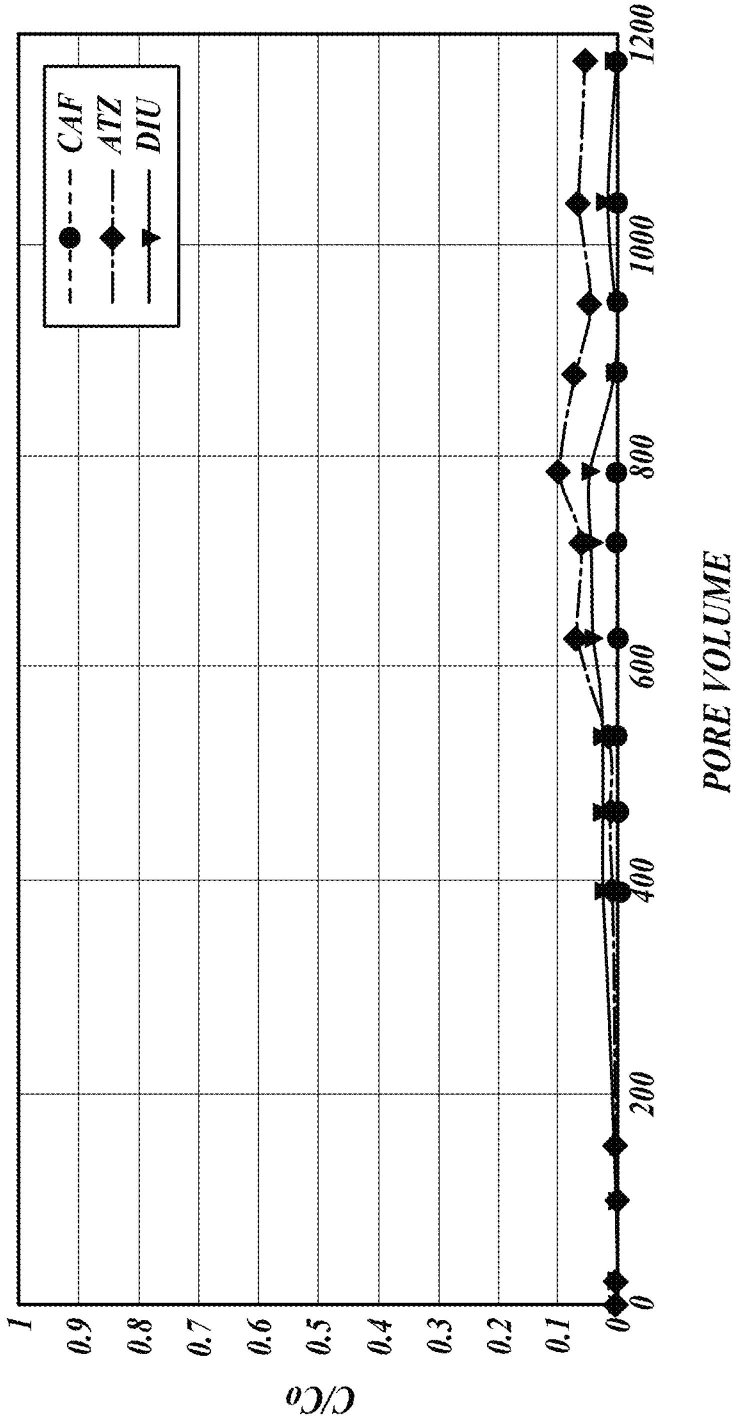
FIG. 18 illustrates 3.0 wt % SCGKOH column breakthrough curves plotting normalized contaminant concentration as a function of pore volume for caffeine, atrazine and diuron, in accordance with an embodiment of the present disclosure, where the feed solution contained 50 μg/L of each contaminant, 10 mg-C/L NOM, and a SSM.

The known octanol-water partition coefficients (log $K_{ow}$) were compared to a calculated soil adsorption coefficient (log $K_d$) to determine if biochar had any selective adsorption affinity for the more hydrophobic compounds (FIG. 15).

The log $K_d$ analysis showed no trends of increasing adsorption by biochar for more hydrophobic compounds. This is again consistent with the batch sorption data and shows biochar has high removal capabilities regardless of hydrophobicity.

Column Studies

Bench scale column testing was conducted with the SCGKOH biochar to investigate adsorption capabilities and lifetime in a more real-world setting. The column studies tested three biochar weight percentages: 0 wt % (sand only), 0.5 wt %, and 3.0 wt %. Each weight percent was tested in triplicates for a total of nine columns. The trace organics plotted in FIGS. 16-19 are in order of increasing log $K_{ow}$ values.

Sand-Only Columns

The sand-only columns (FIG. 16) reached complete breakthrough after 13 pore volumes (1.2 L) of the stormwater mixture.

This quick breakthrough was expected as sand has a low adsorptive capacity for organic contaminants.

0.5 wt % Columns

The 0.5 wt % columns (FIG. 17) reached a maximum of 60% breakthrough (according to FIP) after 211 pore volumes (20 L).

The variances in data are likely due to inconsistent mixing of biochar in the sand, allowing the development of preferential pathways within the column. These pathways would allow some trace organic contaminants to pass through the length of the column would allow some trace organic contaminants to pass through the length of the column without encountering biochar. Lower adsorption affinity for fipronil (more hydrophobic, log $K_{ow}$=) and higher adsorption affinity for caffeine (less hydrophobic, log $K_{ow}$=−0.07) contradicted the results from the batch sorption tests. Even at low weight percentages of biochar, there was still high organic contaminant removal over several pore volumes indicating high removal capacities and potentially long lifetimes of SCGKOH.

3.0 wt % Columns

The 3.0 wt % columns removed 100% of contaminants until 130 pore volumes (16 L) and are continuing to remove nearly 100% of the less hydrophobic compounds (CAF, ATZ, and DIU) after 1200 pore volumes (FIG. 18) in this ongoing experiment.

High adsorption rates of CAF and DIU with slightly lower adsorption of ATZ by SCGKOH were consistent with batch sorption analyses.

Figure 19:
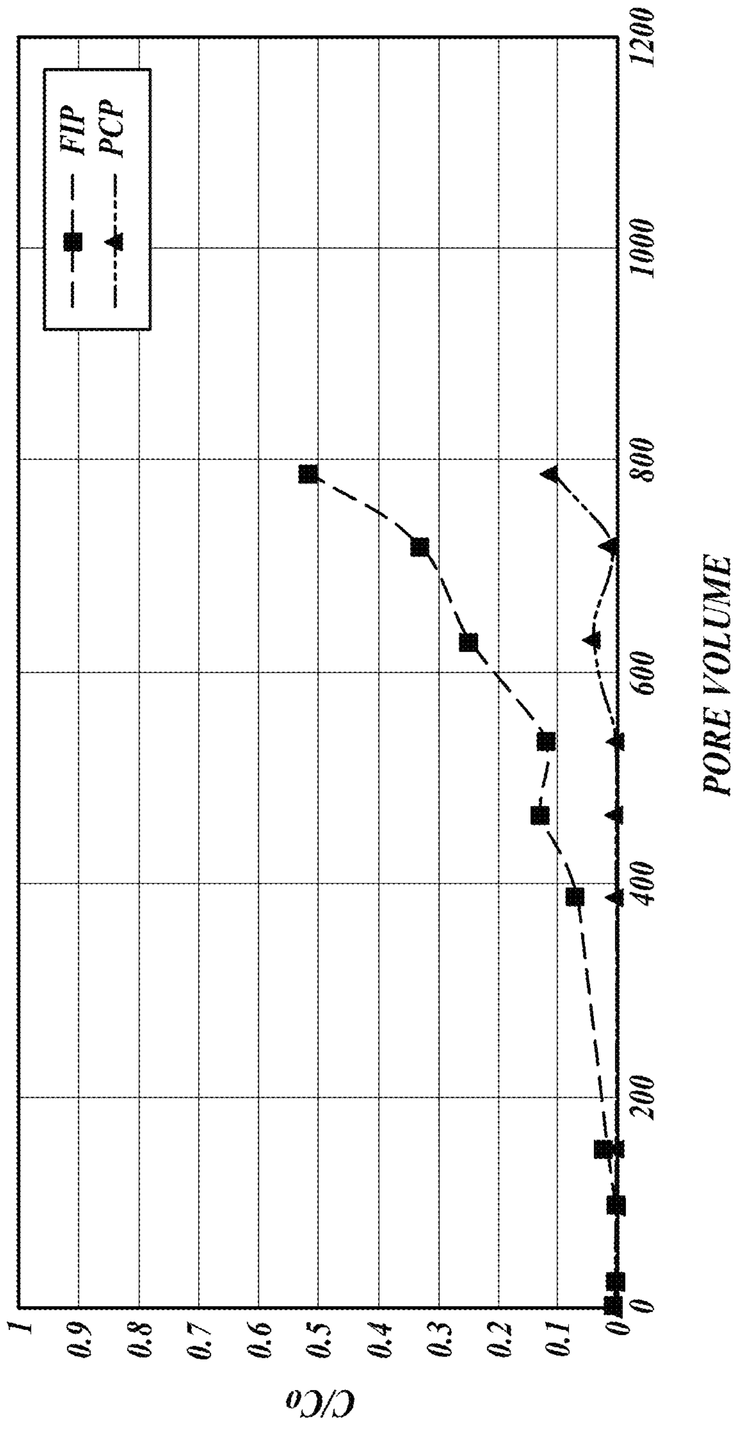
FIG. 19 illustrates 3.0 wt % SCGKOH column breakthrough curves plotting normalized contaminant concentration as a function of pore volume for fipronil and pentachlorophenol, in accordance with an embodiment of the present disclosure, where the feed solution contained 50 μg/L of each contaminant, 10 mg-C/L NOM, and a SSM.
Figure 20A:
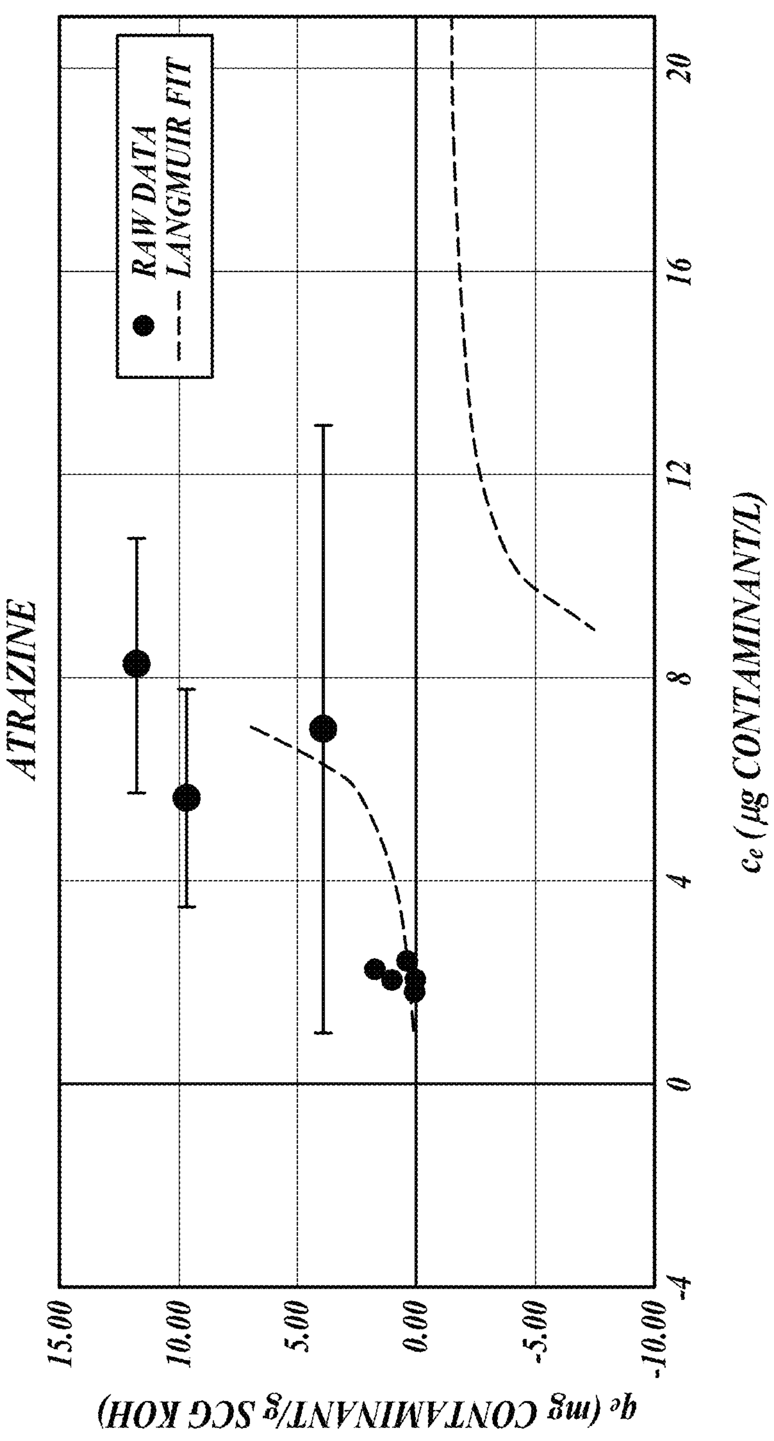
FIGS. 20A-20D illustrate batch adsorption capacity and Langmuir isotherm fit of 1 g/L SCGKOH and varying initial concentrations of (20A) atrazine, (20B) diuron, (20C) fipronil, and (20D) pentachlorophenol in a SSM with 10 mg-C/L, in accordance with an embodiment of the present disclosure.
Figure 20B:
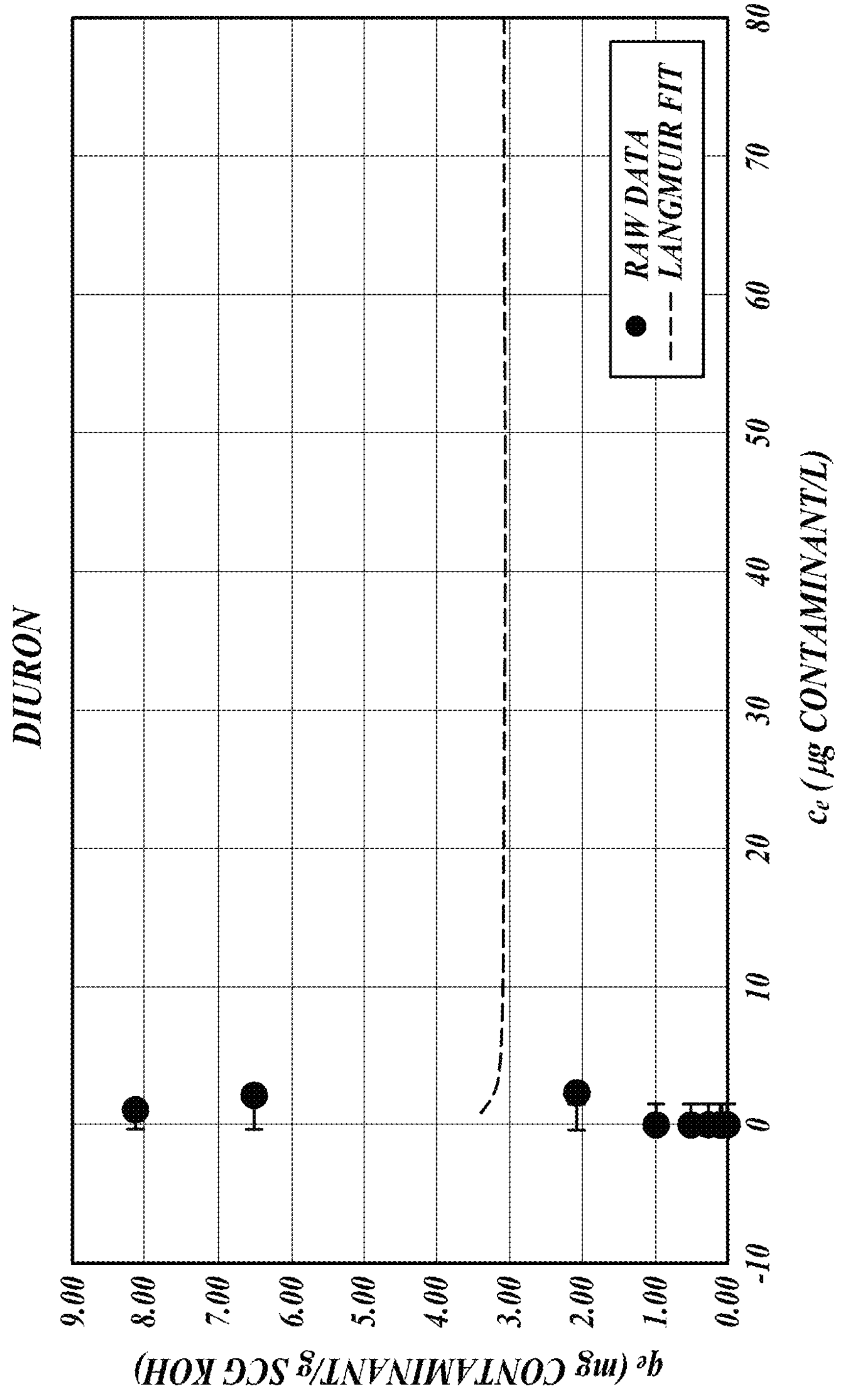
Figure 20C:
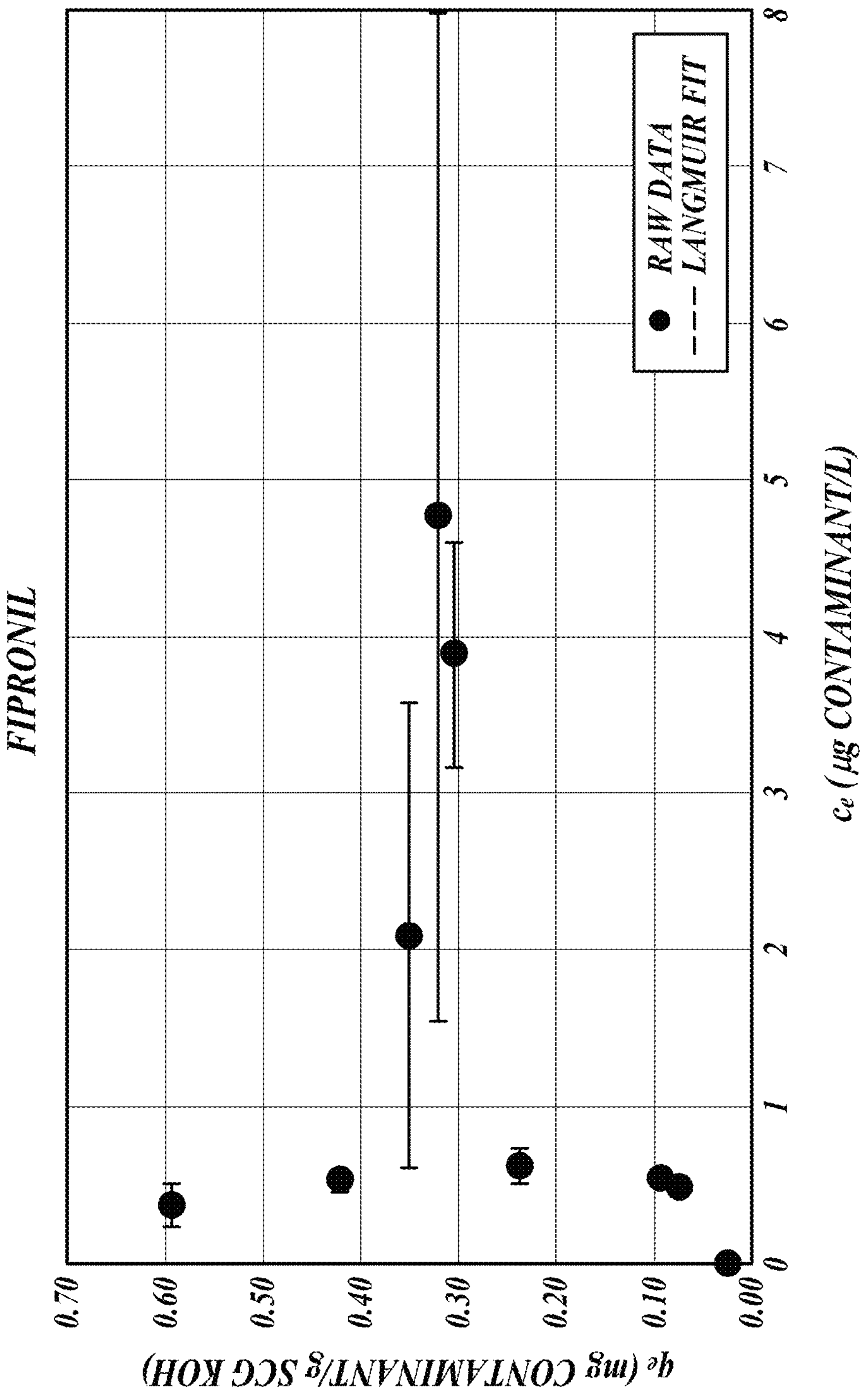
Figure 20D:
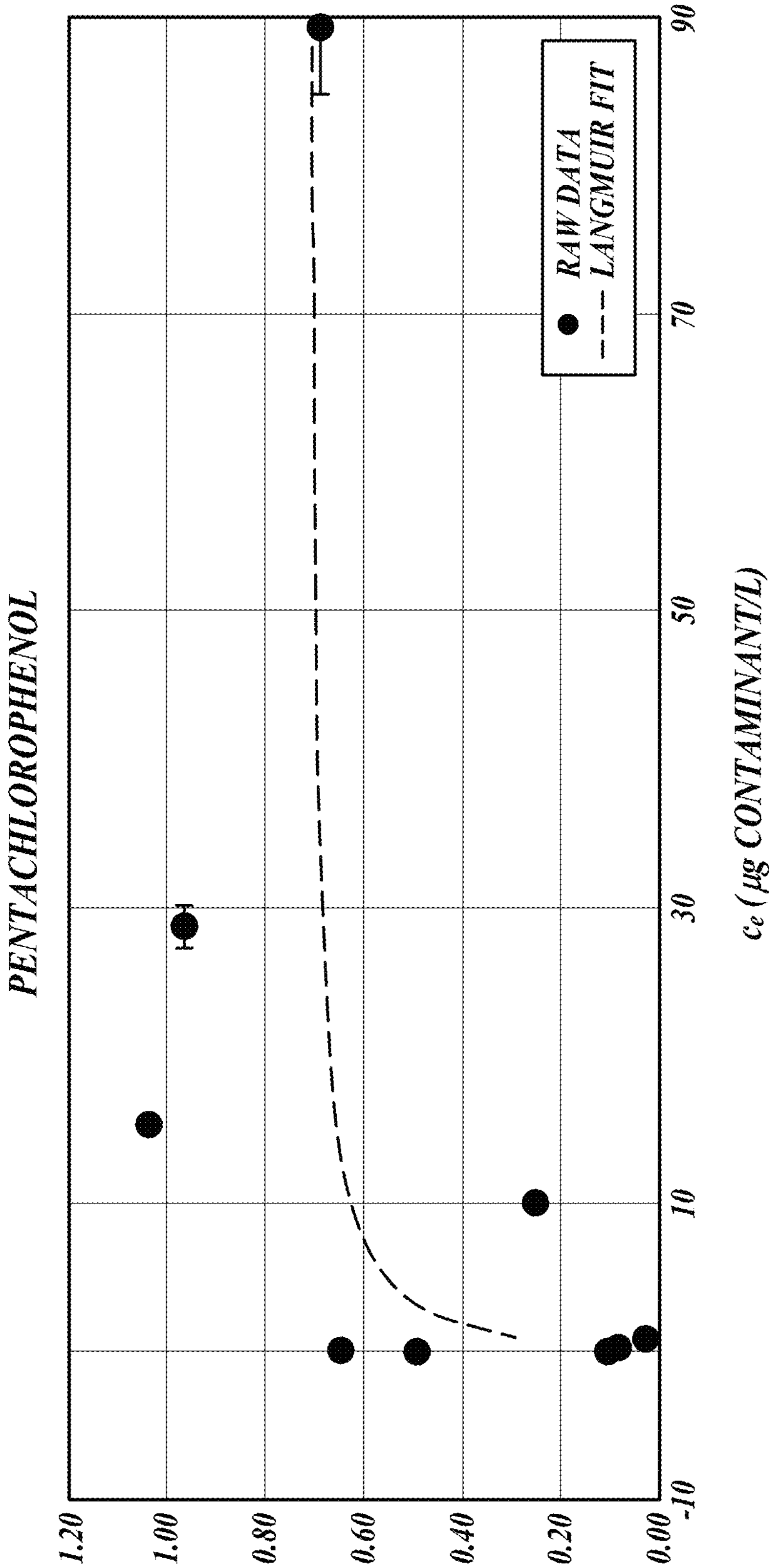

The 3.0 wt % columns also continued to remove nearly 100% of PCP after 800 pore volumes, but did reach 50% breakthrough of FIP after 800 pore volumes (FIG. 19). The adsorption data for FIP and PCP for the 3.0 wt % columns are only reported to 800 pore volumes (versus 1200 for CAF, ATZ, and DIU) as the later LC-MS data for FIP and PCP reported low internal standard areas and could not be used. See also FIGS. 21A-21C.

Lower adsorption affinity for FIP contradicted the results from the adsorption capacity batch sorption tests. Additional analysis of the LC-MS data may be needed, and samples will need to be re-analyzed to validate measured concentrations on instrument conditions improve. The results from the column studies show high removal capabilities of the SCGKOH biochar over a wide variety of contaminants for a long lifetime. This is especially true with higher weight percent of biochar amended in the sand columns.

Complete breakthrough for PCP (C/Co=1) for the 3 wt % column was calculated using a polynomial fit on the existing column data. Projections for compete breakthrough of PCP were found to occur after 4262 pore volumes (460 L at 50 μg/L for a total of 23,0000 μg). An estimate for a hypothetical rainfall, watershed, and filter design was calculated by Schuler 1987 showing 430 $m^3$ of runoff for a 5-cm rainfall event over a 1-ha parking area with 90% impermeable surface area. Using the actual stormwater concentration of PCP from Masoner et al. of 400 ng/L gives a total PCP concentration of 430 μg from one storm event. Given this calculation, the 4 grams of biochar used in the 3 wt % columns should be able to treat PCP in a BMP for 53 storm events. This result shows long lifetime potentials of a small amount of biochar.

The term "about" means plus or minus 5% of the stated value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of producing biochar, the method comprising:
- heating dried spent coffee grounds in an oven in a first pyrolysis temperature range of about 200° C. to about 400° C. for about four hours to provide an intermediate biochar; and
- heating the intermediate biochar and a caustic in the oven in a second pyrolysis temperature range to provide the biochar.

2. The method of claim 1, wherein the second pyrolysis temperature range is in a range of about 200° C. to about 1,000° C.

3. The method of claim 1, wherein heating the dried spent coffee grounds comprises:
- heating the oven in which the dried spent coffee grounds are disposed to a first evaporation temperature in a range of about 100° C. to about 300° C. for about an hour to evaporate water from within pore spaces of the dried spent coffee grounds; and
- heating the oven in which the dried spent coffee grounds are disposed to the first pyrolysis temperature range for about four hours to pyrolyze the dried spent coffee grounds.

4. The method of claim 1, wherein heating the intermediate biochar and the caustic comprises:
- heating the intermediate biochar and the caustic at a second evaporation temperature in a range of about 100° C. to about 300° C. for about an hour to evaporate water from within pore spaces of the intermediate biochar; and
- heating the intermediate biochar and the caustic at a second pyrolysis temperature in a range of about 700° C. to about 1,000° C. for about 30 minutes to pyrolyze the intermediate biochar.

5. The method of claim 1, further comprising flowing an inert gas through the oven while heating the dried spent coffee grounds and while heating the intermediate biochar.

6. The method of claim 1, wherein a mass: mass ratio of the caustic to the intermediate biochar is about 1:1.

7. The method of claim 1, further comprising mixing the intermediate biochar and caustic.

8. The method of claim 1, further comprising drying spent coffee grounds to provide the dried spent coffee grounds.

9. The method of claim 1, further comprising rinsing the biochar with a dilute acidic solution.

10. D) A biochar produced according to a method according to claim 1.

11. The biochar of claim 10, wherein the biochar has a surface area in a range of about 700 $m^2/g$ to about 900 $m^2/g$.

12. The biochar of claim 10, wherein the biochar has a fixed carbon percentage in a range of about 70% to about 90%.

13. The biochar of claim 10, wherein the biochar has a zeta potential in a range of about −35 mV to about −55 mV in a circumneutral pH range.

* * * * *